United States Patent
Kim et al.

(10) Patent No.: US 9,900,577 B2
(45) Date of Patent: *Feb. 20, 2018

(54) APPARATUS AND METHOD FOR PROVIDING CONTENT FOR SYNCHRONIZING LEFT/RIGHT STREAMS IN FIXED/MOBILE CONVERGENCE 3DTV, AND APPARATUS AND METHOD FOR PLAYING CONTENT

(75) Inventors: Sung Hoon Kim, Daejeon (KR); Joo Young Lee, Daejeon (KR); Jin Soo Choi, Daejeon (KR); Jin Woong Kim, Daejeon (KR); Suk Jin Hong, Seoul (KR); Jin Suk Kwak, Daejeon (KR); Min Suk Lee, Daejeon (KR); Dong Wook Kang, Seoul (KR); Kyeong Hoon Jung, Seoul (KR)

(73) Assignees: Electronics and Telecommunications Research Institute, Daejeon (KR); KAI MEDIA CO., Daejeon (KR); Hidea Solutions Co., Ltd., Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 816 days.

This patent is subject to a terminal disclaimer.

(21) Appl. No.: 14/238,192

(22) PCT Filed: Aug. 10, 2012

(86) PCT No.: PCT/KR2012/006394
§ 371 (c)(1),
(2), (4) Date: May 9, 2014

(87) PCT Pub. No.: WO2013/022311
PCT Pub. Date: Feb. 14, 2013

(65) Prior Publication Data
US 2014/0313289 A1    Oct. 23, 2014

(30) Foreign Application Priority Data

Aug. 10, 2011  (KR) .................. 10-2011-0079891
Dec. 19, 2011  (KR) .................. 10-2011-0137290
Aug. 10, 2012  (KR) .................. 10-2012-0087545

(51) Int. Cl.
*H04N 13/00*    (2006.01)
*H04N 21/2362*    (2011.01)
(Continued)

(52) U.S. Cl.
CPC ..... *H04N 13/0051* (2013.01); *H04N 13/0059* (2013.01); *H04N 21/2362* (2013.01);
(Continued)

(58) Field of Classification Search
CPC .......... H04N 13/0051; H04N 13/0059; H04N 21/2362; H04N 21/242; H04N 21/4307; H04N 21/4345
(Continued)

(56) References Cited

U.S. PATENT DOCUMENTS

2002/0196850 A1* 12/2002 Liu .................. H04N 21/23424
375/240.12
2010/0049865 A1*  2/2010 Hannuksela ... H04N 21/234327
709/231
(Continued)

FOREIGN PATENT DOCUMENTS

KR     1020100042771 A    4/2010
KR     1020100049873 A    5/2010
(Continued)

*Primary Examiner* — Jessica M Prince
(74) *Attorney, Agent, or Firm* — William Park & Associates Ltd.

(57) ABSTRACT

An apparatus and a method for synchronizing left and right streams in a stationary/mobile hybrid 3DTV are disclosed. The apparatus according to an exemplary embodiment may synchronize content streams corresponding to left and right
(Continued)

images using a timestamp pairing mode, a timestamp offset mode, and a network time protocol (NTP) synchronization mode.

14 Claims, 15 Drawing Sheets

(51) Int. Cl.
*H04N 21/43* (2011.01)
*H04N 21/242* (2011.01)
*H04N 21/434* (2011.01)

(52) U.S. Cl.
CPC ....... *H04N 21/242* (2013.01); *H04N 21/4307* (2013.01); *H04N 21/4345* (2013.01)

(58) Field of Classification Search
USPC .......................................... 348/48
See application file for complete search history.

(56) References Cited

U.S. PATENT DOCUMENTS

| | | | | |
|---|---|---|---|---|
| 2012/0033035 A1* | 2/2012 | Lee | .................... | H04N 13/0048 348/42 |
| 2012/0036277 A1* | 2/2012 | Stokking | ................. | H04N 7/24 709/231 |
| 2013/0258054 A1* | 10/2013 | Park | .................... | H04N 13/0051 348/43 |

FOREIGN PATENT DOCUMENTS

| | | |
|---|---|---|
| KR | 1020100086440 A | 7/2010 |
| KR | 1020100130385 A | 12/2010 |

\* cited by examiner

APPARATUS AND METHOD FOR PROVIDING CONTENT FOR SYNCHRONIZING LEFT/RIGHT STREAMS IN FIXED/MOBILE CONVERGENCE 3DTV, AND APPARATUS AND METHOD FOR PLAYING CONTENT

TECHNICAL FIELD

The present invention relates to a content providing apparatus and method, and a content reproduction apparatus and method for synchronizing left and right streams, and more particularly to an apparatus and a method for synchronizing left and right streams in a stationary/mobile hybrid three-dimensional television (3DTV).

BACKGROUND ART

The Advanced Television Systems Committee (ATSC) A/153 Mobile Handheld (M/H) standard is a terrestrial broadcast standard in North America for an in-band mobile TV service capable of providing terrestrial mobile digital television (MDTV) broadcast services simultaneously by inserting/transmitting a main service stream for an existing stationary DTV and a time-division mobile stream within a single RF 6 megahertz (MHz) channel. Here, the MDTV services utilize part of a bandwidth of 19.39 megabits per second (Mbps), which is an ATSC data transmission rate, and Internet Protocol (IP) datagram-based transmission technology, thereby providing mobile/portable TV viewers with broadcast services.

In detail, an entire broadcast frame of about 19.39 Mbps is transmitted via time division with an ATSC main broadcast stream moving picture experts group-2 transport stream (MPEG-2 TS) packet and an MDTV mobile stream packet (IP datagram), making simultaneous provision of two broadcast services possible, in an independent manner. A plurality of methods are available for providing a three-dimensional television (3DTV) service in such broadcast environments, for example, transmitting a stream of a main view image needed to compose a stereoscopic image, which is used for a stationary two-dimensional (2D) service, and a stream of a additional view image used to compose a 3D image along with the main view image as independent streams to an MPEG-2 TS packet.

Although the main view image stream is transmitted through an ATSC main broadcast stream to secure reverse compatibility with an existing stationary 2D broadcast, this method involves allocation of an additional band for transmission the additional view image stream. Due to the allocation of an additional band, reducing an amount of data transmitted for individual 2D screen information is necessary, resulting in deterioration of an existing 2D broadcast service.

To resolve such an issue, stationary and mobile hybrid 3DTV technology enabling transmission of a additional view image using a 2D mobile service stream instead of separately transmitting the additional view image for composing a 3D image is suggested. The stationary and mobile hybrid 3DTV technology has an advantage of providing a 3DTV service without allocation of an additional bandwidth for transmission of a additional view image. Here, in a stationary and mobile hybrid 3DTV, an ATSC main broadcast stream for a stationary broadcast uses an MPEG-2 system timing model based on a presentation timestamp/program clock reference (PTS/PCR) for video/audio synchronization, while an MDTV service stream for a mobile broadcast uses a timing model based on a real-time transport protocol (RTP) timestamp for video/audio synchronization.

In a conventional method, since an ATSC main broadcast standard and an MDTV broadcast standard have different video/audio synchronization modes, synchronizing an image stream of a left image and an image stream of a right image is difficult. Thus, there is need for a method of interpreting common presentation time information between a timing model based on a PTS/PCR and a timing model based on an RTP timestamp for synchronization of left and right images of the stationary and mobile hybrid 3DTV.

DISCLOSURE OF INVENTION

Technical Goals

An aspect of the present invention provides an apparatus and a method of synchronizing left and right images in a hybrid three-dimensional television (3DTV) configured in different broadcast standards.

An aspect of the present invention provides a method of configuring synchronization information, a method of transmitting and receiving synchronization information, and a method of calculating a playback time for synchronization of left and right images between different timing models in a hybrid 3DTV configured in different broadcast standards.

Technical Solutions

A content providing apparatus according to a first exemplary embodiment of the present invention may include a synchronization information generation unit to generate a timestamp pair including a timestamp corresponding to an access unit (AU) of a one view image and a timestamp corresponding to an AU of a the other view image as synchronization information, and a synchronization information multiplexing unit to multiplex the synchronization information into signaling information.

A content providing apparatus according to a second exemplary embodiment of the present invention may include a synchronization information generation unit to generate a timestamp offset based on timestamps corresponding to an AU of a one view image and an AU of a the other view image to be synchronized as synchronization information, and a synchronization information multiplexing unit to multiplex the synchronization information into signaling information.

A content providing apparatus according to a third exemplary embodiment of the present invention may include a synchronization information generation unit to generate synchronization information using a first timestamp corresponding an AU of a one view image and a second timestamp corresponding to an AU of a the other view image based on a reference timestamp, and a synchronization information multiplexing unit to multiplex the synchronization information into signaling information.

A content reproduction apparatus according to a first exemplary embodiment of the present invention may include a synchronization information demultiplexing unit to extract, as synchronization information, a timestamp pair including a timestamp corresponding to an AU of a one view image and a timestamp corresponding to an AU of a the other view image from signaling information, and a playback time restoration unit to restore playback times of the AUs of the one view image and the the other view image using the synchronization information and a reference clock of the one view image or the the other view image.

A content reproduction apparatus according to a second exemplary embodiment of the present invention may include a synchronization information demultiplexing unit to extract synchronization information related to a timestamp offset between timestamps corresponding to an AU of a one view image and an AU of a the other view image from signaling information, and a playback time restoration unit to restore playback times of the AUs of the one view image and the the other view image using the synchronization information and a reference clock of the one view image or the the other view image.

A content reproduction apparatus according to a third exemplary embodiment of the present invention may include a synchronization information demultiplexing unit to extract synchronization information based on a first timestamp corresponding an AU of a one view image and a second timestamp corresponding to an AU of a the other view image based on a reference timestamp from signaling information, and a playback time restoration unit to restore playback times of the AUs of the one view image and the the other view image using the synchronization information.

A content providing method according to a first embodiment may include generating a timestamp pair including a timestamp corresponding to an AU of a one view image and a timestamp corresponding to an AU of a the other view image as synchronization information and multiplexing the synchronization information into signaling information.

A content providing method according to a second exemplary embodiment may include generating a timestamp offset between timestamps corresponding to an AU of a one view image and an AU of a the other view image to be synchronized as synchronization information and multiplexing the synchronization information into signaling information.

A content providing method according to a third exemplary embodiment may include generating synchronization information using a first timestamp corresponding an AU of a one view image and a second timestamp corresponding to an AU of a the other view image based on a reference timestamp and multiplexing the synchronization information into signaling information.

A content reproduction method according to a first exemplary embodiment may include extracting, as synchronization information, a timestamp pair including a timestamp corresponding to an AU of a one view image and a timestamp corresponding to an AU of a the other view image from signaling information and restoring playback times of the AUs of the left and the other view images using the synchronization information and a reference clock of the one view image or the the other view image.

A content reproduction method according to a second exemplary embodiment may include extracting, as synchronization information, a timestamp offset between timestamps corresponding to an AU of a one view image and an AU of a the other view image from signaling information and restoring playback times of the AUs of the left and the other view images using the synchronization information and a reference clock of the one view image or the the other view image.

A content reproduction method according to a third exemplary embodiment may include extracting synchronization information based on a first timestamp corresponding an AU of a one view image and a second timestamp corresponding to an AU of a the other view image based on a reference timestamp from signaling information, the synchronization information being associated with a reference timestamp, and restoring playback times of the AUs of the left and the other view images using the synchronization information.

Effects of the Invention

According to the present invention, left and right images may be synchronized using synchronization information in a hybrid 3DTV broadcast in accordance with a stationary broadcast standard and a mobile broadcast standard.

Further, audio/video synchronization between left and right images of different timing models may be performed by generating and multiplexing synchronization information and demultiplexing and restoring generated and multiplexed synchronization information.

In addition, although there is an offset between reference clocks of content streams in accordance with different broadcast standards, and AUs have different timestamps, audio and video synchronization of content streams may be performed in accordance with different broadcast standards.

BEST MODE FOR CARRYING OUT THE INVENTION

Figure 1:
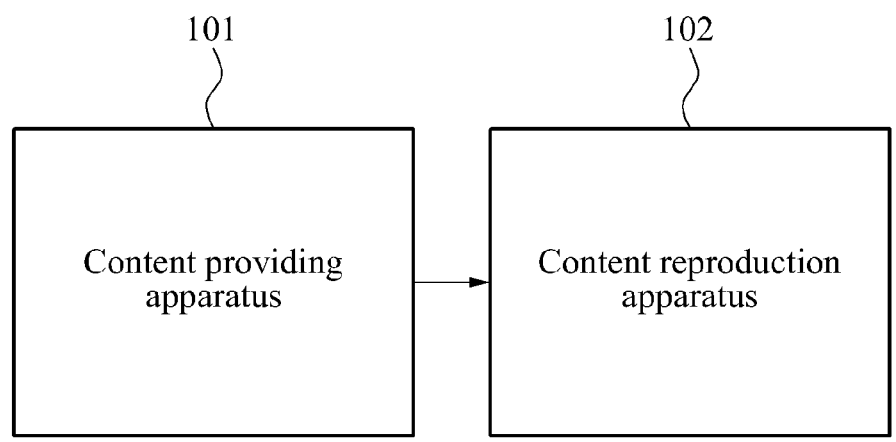
FIG. 1 illustrates a content providing apparatus and a content reproduction apparatus according to an exemplary embodiment of the present invention.

Hereinafter, exemplary embodiments of the present invention will be described in detail with reference to the accompanying drawings. However, the present invention is not limited to the exemplary embodiments. Also, like reference numerals refer to the like elements throughout.

The present invention relates to a technique of synchronizing left and right images to compose/restore three-dimensional (3D) image content when both left and right images are received. When left and right images independently providing two-dimensional (2D) image broadcast services are transmitted through a moving picture experts group (MPEG)-2 transport stream (TS) transmitted via an Advanced Television Systems Committee (ATSC) main broadcast network, and a packetized stream transmitted via a mobile digital television (MDTV) broadcast network in an ATSC terrestrial broadcast system providing both fixed broadcasting, for example, an ATSC main broadcast service, and mobile broadcasting, for example, an MDTV broadcast service.

In advance of exemplary embodiments of the present invention being described, a brief definition of terms used hereinafter will be provided.

First, ATSC-Mobile/Handheld (ATSC-M/H) A/153 is a next-generation standard in North America for mobile digital TV which allows an ATSC system capable of supporting a transmission rate of 19.39 megabits per second (Mbps) through a 6 megahertz (MHz) bandwidth, to add mobile content to a space generated when transmitting fixed DTV content through an ATSC main broadcast network and to transmit the mobile content.

An ATSC 8-Vestigial Side Band (VSB) is a modulation scheme used to transmit a broadcast in North America.

An access unit (AU) is a basic audio/video encoding unit of an elementary stream, in which an audio and a video are generally configured based on a frame unit.

A real-time transport protocol (RTP) is a standard for transmitting audio/video data over an internet protocol (IP) network.

An RTP control protocol (RTCP) is a standard for transmitting a status of a transmission network or synchronization information on an audio/video stream for RTP transmission.

An RTCP sender report (RTCP_SR) is an RTCP transmission packet type used to transmit a status of a transmission network and timing information, transmitted periodically by a sender, to a receiver.

A network time protocol (NTP) is a protocol used to synchronize clock times of computers connected via a network.

A presentation timestamp (PTS) is a 33-bit timestamp loaded onto a packetized elementary stream (PES) header and transmitted so as to synchronize presentation times of an audio AU or a video AU in an ATSC main broadcast network.

A PES is a packet obtained by dividing each elementary stream (ES) into a predetermined length for transmitting an audio/video ES in an ATSC main broadcast network. Here, the PES header includes a PTS.

One view image is defined one of left image or right image. If the one view image is left image, the other view image is defined right image. And, if the one view image is right image, the other view image is defined left image.

FIG. 1 illustrates a content providing apparatus and a content reproduction apparatus according to an exemplary embodiment of the present invention.

FIG. 1 illustrates a content providing apparatus 101 and a content reproduction apparatus 102.

According to an exemplary embodiment, the content providing apparatus 101 may transmit content streams corresponding to different broadcast standards to the content reproduction apparatus 102. For example, the broadcast standards may include a stationary broadcast standard and a mobile broadcast standard. In this example, the stationary broadcast standard may include an ATSC main broadcast standard, while the mobile broadcast standard may include an MDTV broadcast standard. Although the following description is provided based on the ATSC main broadcast standard and the MDTV broadcast standard, the present invention is not limited to such standards, and different types of broadcast standards for 3DTV broadcasting may be also included.

Here, a main content stream in accordance with the ATSC main broadcast standard may be a left image for 3DTV broadcasting, while a additional view content stream in accordance with the MDTV broadcast standard may be a right image. Alternatively, the main content stream may be a right image, while the additional view content stream may be a left image. Further, left and right images for a 3D image are divided into independent video streams for example, a main view image and a additional view image, that may be transmitted from the content providing apparatus 101 to the content reproduction apparatus 102. In this example, the main view image main view image may be transmitted to the main content stream, while the additional view image may be transmitted to the additional view content stream. Since the left and right images are represented as different timing models, synchronization of the left and right images for 3DTV broadcasting is necessary.

The content providing apparatus 101 may be an independent device separated from an encoder and a modulator for different broadcast standards. The content providing apparatus 101 may receive content streams generated through encoders in accordance with different broadcast standards or content streams generated through encoders having the same broadcast standard, but being separate. For example, the content providing apparatus 101 may receive content streams generated through an encoder in accordance with a stationary broadcast standard, the ATSC main broadcast standard, and an encoder in accordance with a mobile broadcast standard, as an example, the MDTV broadcast standard. Subsequently, the content providing apparatus 101 may generate synchronization information proper for the content streams output from the two encoders and multiplex the synchronization information. A final stream obtained via multiplexing may be multiplexed again or transmitted to a modulator.

Further, the content providing apparatus 101 may be configured in an integrated form with an encoder. In this case, synchronization information may be easily generated using sampling times in different broadcast standards.

The content reproduction apparatus 102 may serve to demodulate the ATSC main content stream and the MDTV additional view content stream. The content reproduction apparatus 102 may be applied to a variety of devices, such as a TV, a personal computer (PC), a universal serial bus (USB)-type PC peripheral device, a smart phone, a set-top box, a tablet PC, a video player, a digital versatile disc (DVD) player, a digital multimedia broadcasting (DMB) player, and a Blu-ray player.

Figure 2:
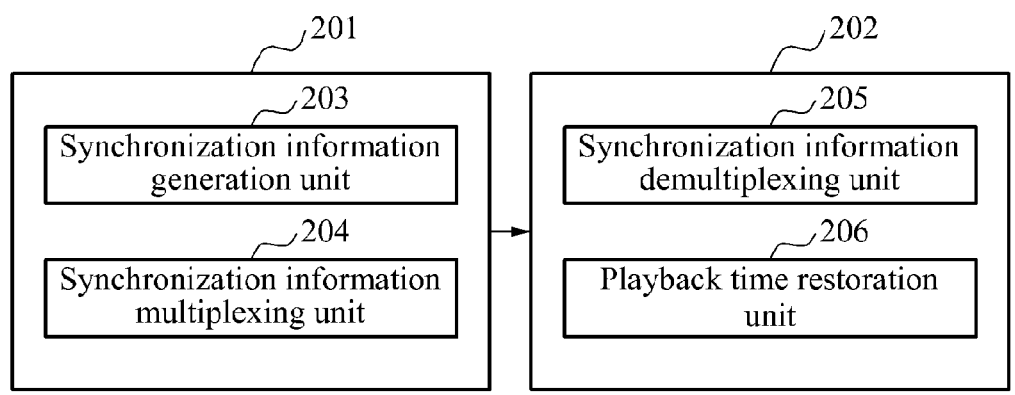
FIG. 2 illustrates detailed configurations of a content providing apparatus and a content reproduction apparatus according to an exemplary embodiment of the present invention.

FIG. 2 illustrates detailed configurations of a content providing apparatus and a content reproduction apparatus according to an exemplary embodiment of the present invention.

Referring to FIG. 2, a content providing apparatus 201 may include a synchronization information generation unit 203 and a synchronization information multiplexing unit 204. Further, a content reproduction apparatus 202 may include a synchronization information demultiplexing unit 205 and a playback time restoration unit 206.

According to an exemplary embodiment, the content providing apparatus 201 may generate synchronization information in accordance with (i) a timestamp pairing mode, (ii) a timestamp offset mode, and (iii) a network time protocol (NTP) synchronization mode. FIG. 2 illustrates (i) the timestamp pairing mode and (ii) the timestamp offset mode.

In the present invention, a main content stream corresponds to a left image, while a additional view content stream corresponds to a right image, without being limited thereto. Alternatively, the left image and the right image may be switched. Further, the present invention may be applied to not only an image but also a voice/sound. Generally, a playback time of a additional view image transmitted through a broadcast network may not be synchronized with that of a main view image transmitted through the broadcast network. Thus, transmitting synchronization information is necessary for synchronizing the main view image and the additional view image at a particular synchronization time so as to synchronize and reproduce the main view image and the additional view image in a frame unit in the form of an AU. Here, the main view image may correspond to a left image for a 3DTV service, and the additional view image may correspond to a right image.

<Timestamp Pairing Mode>

In the timestamp pairing mode, a timestamp of an AU of a left image and a timestamp of an AU of a right image to be output at the same particular time for a 3DTV service are used as synchronization information. In detail, a timestamp pair including a timestamp corresponding to an AU of a left image and a timestamp corresponding to an AU of a right image is used as the synchronization information. When a timing model of the left image is the same as that of the right image, the timestamp pair may be formed of timestamps in the same form. Alternatively, when the left and right images are transmitted in different broadcast standards and thus have different timing models, the timestamp pair may be formed of timestamps in different forms. For example, when the left image is transmitted in accordance with the ATSC main broadcast standard, the timestamp corresponding to the AU of the left image is represented by a PTS. When the right image is transmitted in accordance with the MDTV broadcast standard, the timestamp corresponding to the AU of the right image is represented by an RTP timestamp. Thus, in the timestamp pairing mode, a timestamp pair including timestamps of left and right images in different forms may be used as the synchronization information.

Further, the timestamp pairing mode involves a process of converting a timestamp of content to be reproduced into a proper form for a reference clock of either the left image or the right image using the synchronization information when playback times of the AUs of the left and right images are restored. In detail, when the playback times of the AUs are restored for 3D reproduction in a stationary/mobile hybrid 3DTV, the timestamp pairing mode may set either an NTP reference clock or a PCR reference clock as a reference clock.

In this instance, even though the left and right images are configured in different timing models such that the timestamp of the AU of the left image and the timestamp of the AU of the right image have different forms, matching the timestamp forms based on a reference clock associated with either the left image or the right image at an actual synchronization process is necessary.

For example, when the NTP reference clock is used in synchronized reproduction in the stationary/mobile hybrid 3DTV, the content reproduction apparatus 202 converts the PTS of the AU of the left image (ATSC-Main) into the form of an NTP timestamp. Further, when the PCR reference clock is used, the content reproduction apparatus 202 converts the RTP timestamp of the AU of the right image (MDTV) into the form of a PTS.

When the left and right images use the same timing model, a timestamp conversion process may be needed in the reproduction as necessary. For example, although both the left image and the right image use a PTS-based timing model and the same PCR-type reference clocks, when encoding processes are carried out independently by separate encoders, absolute reference clock values at sampling time of the encoders for the left and right images may be different. In this case, the AUs of the left and right images to be output at the same time from the main content stream and the additional view content stream in 3D viewing may have different PTS values. In this case, although both images use the same PCR-type reference clocks, conversion of the PTS value of one of the left and right image streams using the synchronization information is necessary for counting a presentation time based on the PCR clock of the other of the image streams.

Hereinafter, the timestamp pairing mode will be described in detail with reference to exemplary embodiment using different forms of timestamps. However, the timestamp pairing mode may be also applied to the same timestamp form having different reference clocks, which will be additionally described only when an explanation for an exemplary embodiment using the same timing model is necessary.

The timestamp pairing mode will be described in detail below.

The synchronization information generation unit 203 may generate timestamps of AUs of left and right images to be output at the same particular time for a 3DTV service as synchronization information. For example, in the timestamp pairing mode, a timestamp pair using different forms of timestamps used for the left and right images may be generated as synchronization information. In this example, the timestamp of the AU of the left image may be a PTS, and the timestamp of the AU of the right image may be an RTP timestamp. Thus, in the timestamp pairing mode, a pair of the PTS and the RTP timestamp synchronized with each other may be used as the synchronization information.

The synchronization information multiplexing unit 204 may insert the generated synchronization information into a main content stream or a additional view content stream as a descriptor transmitted periodically. For example, when the synchronization information is inserted into a stationary broadcast stream as signaling information, the synchronization information multiplexing unit 204 may insert the synchronization information into a signaling table, such as a Program Map Table (PMT), a Virtual Channel Table (VCT), and an Event Information Table (EIT), as a descriptor. When the synchronization information is inserted into a mobile broadcast stream as signaling information, the synchronization information multiplexing unit 204 may insert the synchronization information into a signaling table, such as a Fast Information Channel (FIC), a Service Map Table (SMT), and a Service Labeling Table (SLT), as a descriptor.

Subsequently, the synchronization information demultiplexing unit 205 of the content reproduction apparatus 202 may extract, as the synchronization information, the timestamp pair including the timestamp corresponding to the AU of the left image and the timestamp corresponding to the AU of the right image. For example, the synchronization information demultiplexing unit 205 may extract the synchronization information from signaling information of a content stream in accordance with the ATSC main broadcast standard or signaling information of a content stream in accordance with the MDTV broadcast standard.

The synchronization information demultiplexing unit 205 may extract, as the synchronization information, the timestamp pair including the PTS and the RTP timestamp from signaling information of the main content stream or signaling information of the additional view content stream. The PTS represents an MPEG-2 system-based presentation time, for example, a presentation time for a conventional 2D ATSC main service, of the AU included in the main content stream as a synchronization reference. The RTP timestamp represents an MDTV standard-based presentation time, for example, a presentation time for a conventional 2D ATSC main service, of the AU included in the additional view content stream as a synchronization reference. Alternatively, the synchronization information demultiplexing unit 205 may extract, as the synchronization information, a timestamp pair including timestamps of the left and right images in the same form generated based on different reference clocks from the signaling information of the main content stream or the signaling information of the additional view content stream.

In this instance, the PTS of the main content stream and the RTP timestamp of the additional view content stream as the synchronization references have different forms due to different timing models of the respective standards. However, it is assumed that the PTS of the main content stream and the RTP timestamp of the additional view content stream represent the same presentation time at a synchronization point in 3DTV viewing. When both left and right streams use the PTS timestamps and the PTS of the main content stream and the PTS of the additional view content stream as the synchronization references are generated based on different reference clocks, the AU of the left image and the AU of the right image to be output at the same time may have different PTS values. However, it is assumed that the PTS of the main content stream and the PTS of the additional view content stream represent the same presentation time at a synchronization point in 3DTV viewing. Based on these assumptions, the present invention may restore a playback time of an AU.

The playback time restoration unit 206 may restore the playback times of the respective AUs of the left and right images based on the PCR reference clock or the NTP reference clock using the synchronization information. For example, when synchronization is carried out in accordance with the PCR reference clock, the playback time restoration unit 206 may convert the RTP timestamp of the AU included in the additional view content stream into timing information in a PTS form used in the MPEG-2 TS system standard.

When synchronization is carried out in accordance with the NTP reference clock, the playback time restoration unit 206 may convert the PTS of the AU included in the main content stream into timing information in an NTP timestamp form or RTP timestamp form used in the MDTV standard. This playback time restoration process makes it possible to output the main content stream and the additional view content stream in accordance with a single reference clock, that is, the PCR or NTP clock. Accordingly, the left and right images of the main content stream and the additional view content stream mutually matched may be output at the same time in accordance with the corresponding reference clock.

The timestamp pairing mode will be described in detail with reference to FIGS. 3 and 4.

<Timestamp Offset Mode>

When a main content stream corresponding to a left image for a 3DTV broadcast service and a additional view content stream corresponding to a right image have the same frame rate and timestamps used for the main content stream and the additional view content stream have the same clock rate, timestamp offsets of the main content stream and the additional view content stream may be used as synchronization information. For example, in a stationary/mobile hybrid 3DTV system, left and right images have the same frame rate, and a PTS of an MPEG-2 system and an RTP timestamp of an MDTV system have the same clock rate. Accordingly, the timestamp offset mode may be used, in which offsets of timestamps corresponding to AUs of the left and right images to be output at the same particular time for a 3DTV service are used as synchronization information. In detail, in the timestamp offset mode, the timestamp offsets based on the timestamps corresponding to the AUs of the left and right images to be synchronized are generated as the synchronization information.

Here, the timestamps of the left and right images may be in the same form or different forms. For example, the timestamps of both left and right images may be a PTS. Alternatively, the timestamp of the left image is a PTS, while the timestamp of the right image is an RTP timestamp. Further, in the timestamp offset mode, a timestamp of a content to be reproduced may be converted, using the synchronization information, into a proper form for a reference clock when playback times of the AUs of the left and right images are restored. When the left and right images use different timing models, the timestamp offset mode involves a process of converting a timestamp of content to be reproduced into a proper form for a reference clock of either the left image or the right image using the synchronization information when the playback times of the AUs of the left and right images are restored. In detail, when a playback time of an AU is restored for a 3D reproduction in the stationary/mobile hybrid 3DTV, the timestamp offset mode may set either the NTP reference clock or the PCR reference clock as a reference clock.

In this instance, although the left and right images are configured in different timing models so that the timestamp of the AU of the left image and the timestamp of the AU of the right image have different forms, matching the timestamp forms based on a reference clock associated with either the left image or the right image at an actual synchronization process is necessary.

For example, when the NTP reference clock is used in synchronized reproduction in the stationary/mobile hybrid 3DTV, the content reproduction apparatus 202 converts the PTS of the AU of the left image (ATSC-Main) into an NTP timestamp form. Further, when the PCR reference clock is used, the content reproduction apparatus 202 converts the RTP timestamp of the AU of the right image (MDTV) into a PTS form.

When the left and right images use the same timing model, a timestamp conversion process may be needed in the reproduction. For example, although both the left image and the right image encoding use a PTS-based timing model and the same PCR-type reference clocks, when encoding processes are independently carried out by separate encoders, absolute reference clock values at sampling time of the encoders for the left and right images may be different. In this case, the AUs of the left and right images to be output at the same time from the main content stream and the additional view content stream in 3D viewing may have different PTS values. In this case, although both images use the same PCR-type reference clocks, conversion of the PTS value of one of the main content stream and the additional view content stream using the synchronization information is necessary for counting a presentation time based on the PCR clock of the other of the streams.

Hereinafter, the timestamp offset mode will be described in detail with reference to exemplary embodiment using different timestamp forms. However, the timestamp offset mode may be also applied to the same timestamp form having different reference clocks, which will be additionally described only when explanation for an exemplary embodiment using the same timing model is necessary.

The timestamp offset mode will be described in detail below.

The synchronization information generation unit 203 of the content providing apparatus 201 may generate a timestamp offset between timestamps corresponding to AUs of left and right images to be output at the same particular time for a 3DTV service as synchronization information. The timestamp of the AU of the left image is a PTS, and the timestamp of the AU of the right image is an RTP timestamp. Thus, in the timestamp offset mode, an offset between the PTS and the RTP timestamp synchronized with each other may constitute the synchronization information. In the timestamp offset mode, since synchronization is carried out by simply transmitting the offset between the timestamps corresponding to the left and right images, an amount of data to be transmitted may be less than in the timestamp pairing mode.

For example, the synchronization information generation unit 203 may generate a timestamp offset related to a difference between the PTS of the AU included in the main content stream and the RTP timestamp of the AU included in the additional view content stream, as the synchronization information. When the main content stream and the additional view content stream have different timestamp forms as in the stationary/mobile hybrid 3DTV, for example, when the left image has a PTS of 33 bits and the right image has an RTP timestamp of 32 bits, the PTS and the RTP timestamp have different bits, and thus the timestamp offset is counted using an offset between low-order 32 bits of the PTS and all 32 bits of the RTP timestamp, ignoring the most significant bit (MSB) of the PTS.

The synchronization information multiplexing unit 204 may insert the generated synchronization information into the main content stream or the additional view content stream as a descriptor is transmitted periodically. For example, when the synchronization information is inserted into the main content stream, the synchronization information multiplexing unit 204 may insert the synchronization information into a signaling table, such as a PMT, a TVCT, and an EIT, as a descriptor. When the synchronization information is inserted into the additional view content stream as signaling information, the synchronization information multiplexing unit 204 may insert the synchronization information into a signaling table, such as an FIC, an SMT, and an SLT, as a descriptor.

Subsequently, the synchronization information demultiplexing unit 205 of the content reproduction apparatus 202 may extract the synchronization information from the signaling information of the main content stream in accordance with the ATSC main broadcast standard or the signaling information of the additional view content stream in accordance with the MDTV broadcast standard.

The playback time restoration unit 206 may restore the playback times based on the PCR or the NTP reference clock using the synchronization information extracted from the signaling information. For example, when synchronization is carried out in accordance with the PCR, the playback time restoration unit 206 may convert the RTP timestamp of the AU included in the additional view content stream into timing information in a PTS form used in the MPEG-2 system standard.

When synchronization is carried out in accordance with the NTP reference clock, the playback time restoration unit 206 may convert the PTS of the AU included in the main content stream into timing information in an NTP timestamp form or RTP timestamp form used in the MDTV standard. This playback time restoration process make it possible to output the main content stream and the additional view content stream in accordance with a single reference clock, for example, the PCR or NTP clock. Accordingly, the left and right images of the main content stream and the additional view content stream mutually matched may be output at the same time in accordance with the corresponding reference clock.

The timestamp off mode will be described in detail with reference to FIGS. 5 and 6.

<NTP Synchronization Mode>

In the NTP synchronization mode, an NTP timestamp calculated separately for synchronization of left and right images is generated using a timestamp of an AU of the left image and a timestamp of an AU of the right image.

In the case of the AUs of the left and right images have different timing models but are already synchronized in accordance with a reference clock, the timestamp of the AU of the left image and the timestamp of the AU of the right image at a synchronization time may be obtained using the NTP timestamp that is a reference timestamp obtained from the reference clock. An NTP timestamp as synchronization information used when the left and right images are reproduced may be additionally generated based on the obtained timestamps.

In particular, in the NTP synchronization mode, an NTP timestamp generated separately for synchronization of a main content stream and a additional view content stream is additionally transmitted in addition to a PTS of the main content stream in accordance with the ATSC main broadcast standard and an RTP timestamp of the additional view content stream in accordance with the MDTV broadcast standard.

Hereinafter, the NTP synchronization mode will be described in detail.

The synchronization information generation unit 203 may further generate synchronization information for synchronization of the main content stream in accordance with the ATSC main broadcast standard and the additional view content stream in accordance with the MDTV broadcast standard. For example, the synchronization information generation unit 203 may generate an NTP timestamp for synchronization of the main content stream and the additional view content stream using the PTS of the main content stream and the RTP timestamp of the additional view content stream. Here, the NTP timestamp is a reference timestamp. The PTS of the main content stream and the RTP timestamp of the additional view content stream may be extracted through the NTP timestamp as the reference timestamp.

In detail, the synchronization information generation unit 203 may generate timestamps corresponding to the AUs of the left and right images to be output at the same particular time for a 3DTV service as synchronization information. Here, the same time is a synchronization time for the left and right images. When playback times obtained at the synchronization time through the timestamp of the AU of the left image and the timestamp of the AU of the right image are the same, a 3DTV service may be enabled. In this case, the main content stream corresponding to the left image and the additional view content stream corresponding to the right image to be reproduced from the synchronization time are matched with each other, thereby reproducing a 3D image. The timestamp of the left image may be a PTS, and the timestamp of the right image may be an NTP timestamp. Here, it is presumed that the main content stream and the additional view content stream are synchronized based on an NTP reference clock.

The synchronization information multiplexing unit 204 may multiplex the generated synchronization information. For example, the synchronization information multiplexing unit 204 may packetize the NTP timestamp as the synchronization information and insert the packetized NTP timestamp as a descriptor of the main content stream or the additional view content stream transmitted periodically. Here, the synchronization information may be included as signaling information of the main content stream or the additional view content stream transmitted periodically. For example, the descriptor may include a PMT transmitted periodically through an MPEG-TS packet, an EIT, or a TVCT included in an ATSC PSIP standard.

In addition, the synchronization information multiplexing unit 204 may insert the timestamp of the main content stream, the PTS, into a bit stream as synchronization information in accordance with the ATSC main broadcast standard and the timestamp of the additional view content stream, the RTP timestamp, into a bit stream in accordance with the MDTV broadcast standard.

Subsequently, the synchronization information demultiplexing unit 205 of the content reproduction apparatus 202 may extract the NTP timestamp as the synchronization information from the signaling information of the main content stream or the additional view content stream transmitted periodically in accordance with the ATSC main broadcast standard.

The playback time restoration unit 206 may restore a playback time of the main content stream in accordance with the ATSC main broadcast standard and a playback time of the additional view content stream in accordance with the MDTV broadcast standard using the synchronization information. For example, the playback time restoration unit 206 may restore the playback time of the AU of the main content stream, PTS_A, using the NTP timestamp (NTP_M') as the synchronization information and a PTS' generated from Wallclock_A. Here, the playback time restoration unit 206 may restore the playback time of the main content stream, PTS_A, considering that the PTS' generated from Wallclock_A is reversed.

Alternatively, the playback time restoration unit 206 may restore the playback time of the additional view content stream, PTS_M, using the NTP timestamp (NTP_M') as the synchronization information and the RTP timestamp RTP' obtained from Wallclock_M. Here, the playback time restoration unit 206 may restore the playback time of the AU of the additional view content stream, PTS_M, considering that the RTP timestamp RTPS' is reversed. Here, Wallclock is an NTP timestamp that is a 64-bit fixed-point number unsigned, including a 32-bit integer and a 32-bit decimal. Wallclock_A is an NTP timestamp associated with the main content stream, and Wallclock_M is an NTP timestamp associated with the additional view content stream. Wallclock_A and Wallclock_M are synchronized with each other and have the same NTP timestamp at the synchronization time.

In conclusion, in the NTP synchronization mode, the content providing apparatus 101 may multiplex the NTP timestamp (NTP_M') additionally generated as synchronization information for synchronization of the main content stream and the additional view content stream with the main content stream and transmit the NTP timestamp to the content reproduction apparatus 102.

The NTP synchronization mode will be described in detail with reference to FIG. 7.

Figure 3:
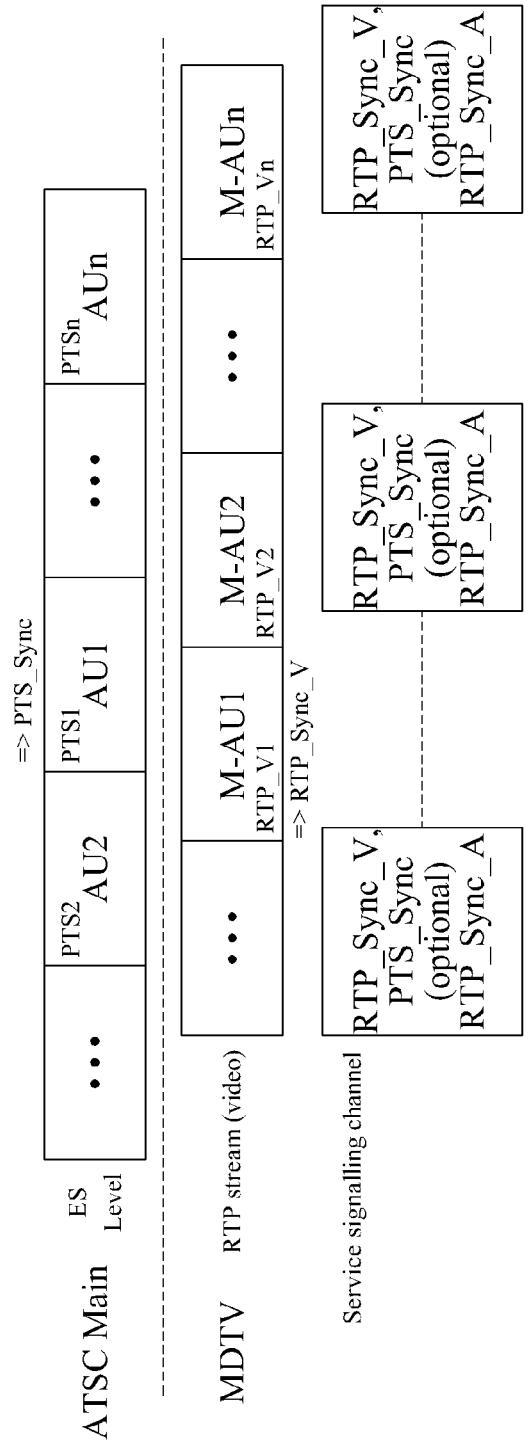
FIG. 3 illustrates a synchronization process based on a timestamp pairing mode using an MDTV signaling channel according to a first exemplary embodiment of the present invention.

FIG. 3 illustrates a synchronization process based on the timestamp pairing mode using an MDTV signaling channel according to a first exemplary embodiment of the present invention.

As described above, in timestamp pairing, a pair of timestamps, a left timestamp: PTS and a right timestamp: RTP, corresponding to AUs of left and right images to be output at the same particular time for a 3DTV service is used as synchronization information. Further, playback times of the AUs may be restored using the timestamp pair as the synchronization information. Here, the timestamp pairing may convert a timestamp of content to be reproduced into an NTP timestamp or a PTS proper for a reference clock, for example, an NTP clock or a PCR clock. The PTS of the left image (ATSC-Main) may be converted in to an NTP timestamp when the reference clock is an NTP clock of an MDTV when the playback times of the AUs are restored in a 3DTV reproduction. The RTP timestamp of the right image (MDTV) may be converted into a PTS when the reference clock is a PCR clock when the playback times of the AUs are restored in a 3DTV reproduction. Here, the NTP timestamp is 64 bits, and the PTS is 33 bits.

The generated synchronization information may be multiplexed through a main content stream in accordance with the ATSC main broadcast standard or a additional view content stream in accordance with the MDTV broadcast standard and transmitted to the content reproduction apparatus 202. Here, the content reproduction apparatus 202 may restore playback times of the main content stream in accordance with the ATSC main broadcast standard or the additional view content streams in accordance with the MDTV broadcast standard using the NTP reference clock or the PCR clock.

A timestamp pairing mode according to an exemplary embodiment of the present invention may be configured in a combination as follows.

(i) Multiplexing of synchronization information through main content stream in accordance with ATSC main broadcast standard—Restoration of playback time based on NTP reference clock (ii) Multiplexing of synchronization information through main content stream in accordance with ATSC main broadcast standard—Restoration of playback time based on PCR (iii) Multiplexing of synchronization information through additional view content stream in accordance with MDTV broadcast standard—Restoration of playback time based on NTP reference clock (iv) Multiplexing of synchronization information through additional view content stream in accordance with MDTV broadcast standard—Restoration of playback time based on PCR FIG. 3 illustrates multiplexing the synchronization information through the additional view content stream in accordance with the MDTV broadcast standard. In FIG. 3, the main content stream in accordance with the ATSC main broadcast standard includes a plurality of AUs ($AU_n$). Here, each AU of the main content stream has a PTS. Also, the additional view content stream in accordance with the MDTV broadcast standard may include a plurality of AUs ($M-AU_n$). Each AU of the additional view content stream has an RTP timestamp.

In FIG. 3, $PTS_n$ represents a PTS of an AU $AU_n$, and $RTP\_V_n$ represents an RTP timestamp of an AU $M-AU_n$ in a video stream. Further, $RTP\_A_n$ represents an RTP timestamp of an AU $M-AU_n$ in an audio stream. In addition, PTS_Sync represents a PTS corresponding to the AU of the left image at a particular synchronization time as a synchronization reference. RTP_Sync represents an RTP timestamp corresponding to the AU of the right image at the particular synchronization time as the synchronization reference. Here, the particular synchronization time as the synchronization reference can be a arbitrary time between the start and the end of a 3D program.

Once PTS_Sync and RTP_Sync at the synchronization time as the synchronization reference are calculated, they may be stored and used as the synchronization information for a period during which any of time bases of the main content stream corresponding to the left image and the additional view content stream corresponding to the right image is not changed. PTS_Sync corresponding to the AU of the left image and RTP_Sync corresponding to the AU of the right image at the synchronization time as the synchronization reference may constitute a timestamp pair, thereby generating synchronization information. The particular synchronization time as the synchronization reference may be a start of a program. Alternatively, the synchronization time may be a intermediate point of the program. However, when the synchronization information is not generated in advance, for example, in the case of a live broadcast, the synchronization information may be generated at a start of the program.

That is, in the timestamp pairing mode, the timestamp pair including PTS_Sync and RTP_Sync may be used as synchronization information.

First, PTS_Sync as the synchronization information may be generated as follows.

A PES may include one or more AUs, and a PTS of a PES header may represent timing information on an AU having a foremost start code in a PES payload. Further, the content reproduction apparatus 202 may calculate presentation times of remaining AUs in consideration of a GOP structure.

Thus, a PTS_sync may be calculated as follows. In detail, when the starts code of the AU to be output at the synchronization reference point is disposed the most forward among the start codes of the AUs starting in the PES payload, a PTS of a corresponding PES may be used as PTS_sync.

When the starts codes of the AUs to be output at the synchronization reference point are not disposed at a most forward position among the start codes of the AUs starting in the PES payload, PTS_sync is calculated based on the GOP structure, as a 33-bit timestamp in the same manner as a PTS.

However, a special regulation is applied such that the AU of the main content stream as the synchronization reference is disposed at a start of the PES in packetizing a PES, the PTS of the PES may be used for PTS_sync without additional calculation.

The synchronization information, PTS_sync, may be also generated by the following process. Based on a sampling time of the left image, the image of ATSC main broadcast, among the AUs of the left and right images to be output simultaneously at the particular synchronization time as the synchronization reference in an encoder, the presentation time of the corresponding AU may be generated in a PTS form.

Second, RTP_Sync as the synchronization information may be generated as follows.

In a mode of transmitting an AVC through an RTP in an ATSC-M/H system, only a non-interleaved mode may be used. An aggregation mode is one of a single network abstraction layer (NAL) Unit mode, STAP-A, and FU-A. Thus, RTP_sync is the same as an RTP timestamp of an RTP packet including an NAL unit included in an AU at the synchronization point as the synchronization reference.

When an interleaved mode is added to the mode of transmitting the AVC through the RTP in the ATSC-M/H system. RTP_sync may be calculated separately from the RTP timestamp. In this case, the content providing apparatus 201 may calculate RTP_sync using a picture sampling time associated with the AU of the additional view content stream as the synchronization reference in encoding. Here, RTP_sync is calculated in the same manner as a conventional calculation method of converting the picture sampling time associated with the AU into an RTP timestamp in the M/H system.

Referring to FIG. 3, the content providing apparatus 201 may multiplex the synchronization information by including the timestamp pair of RTP_Sync and PTS_Sync as the synchronization information in the additional view content stream in accordance with the MDTV broadcast standard as signaling information. When the synchronization information is transmitted through a signaling channel of the additional view content stream in accordance with the MDTV broadcast standard, the synchronization information may be inserted into the signaling channel, such as a service level descriptor or a component level descriptor included in an FIC, an SMT and an SLT loaded into an RS frame and transmitted periodically.

Figure 4:
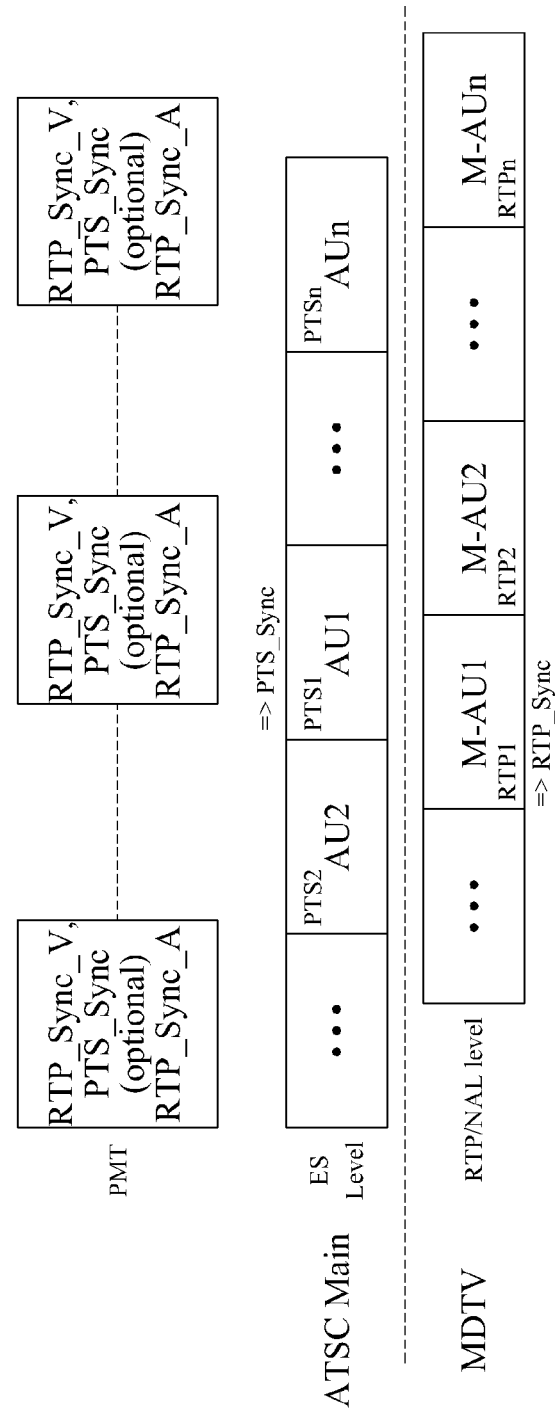
FIG. 4 illustrates a synchronization process based on the timestamp pairing mode using an ATSC main broadcast signaling channel according to the first exemplary embodiment of the present invention.

FIG. 4 illustrates a synchronization process based on the timestamp pairing mode using an ATSC main broadcast signaling channel according to a first exemplary embodiment of the present invention.

Unlike FIG. 3, FIG. 4 illustrates multiplexing the synchronization information (RTP_Sync and PTS_Sync) through a signaling channel of the main content stream in accordance with the ATSC main broadcast standard. Here, the content providing apparatus 201 may use a descriptor, such as a PMT, a VCT and an EIT, loaded into an MPEG-2 TS packet and transmitted periodically.

Although not shown in FIGS. 3 and 4, the multiplexed synchronization information is demultiplexed in the content reproduction apparatus 202, and the extracted synchronization information through demultiplexing is used to restore the playback times.

In detail, the synchronization information may be transmitted to the content reproduction apparatus 202 through the additional view content stream in accordance with the MDTV broadcast standard in FIG. 3 or through the main content stream in accordance with the ATSC main broadcast standard in FIG. 4. Subsequently, the content reproduction apparatus 202 may extract, as the synchronization information (RTP_Sync and PTS_Sync), the timestamp pair from the signaling information of the main content stream or the additional view content stream additional view content stream.

For example, when the synchronization information is extracted by demultiplexing the main content stream in accordance with the ATSC main broadcast standard, the content reproduction apparatus 202 may extract the synchronization information from a PSI or a PSIP, such as a PMT, a VCT and an EIT, loaded into an MPEG-2 TS packet and transmitted periodically. Alternatively, when the synchronization information is extracted by demultiplexing the additional view content stream in accordance with the MDTV broadcast standard, the content reproduction apparatus 202 may extract the synchronization information from the signaling channel, such as a service level descriptor or a component level descriptor included in an FIC, an SMT and an SLT loaded into an RS frame and transmitted periodically.

Subsequently, the content reproduction apparatus 202 may restore the playback time of the main content stream or the additional view content stream. According to an exemplary embodiment of the present invention, the content reproduction apparatus 202 may restore the playback time based on a PCR or an NTP reference clock.

A. Restoration of Playback Time Based on PCR

Restoration of the playback time based on the PCR may be carried out on the basis of Equation 1.

[Equation 1]

(Video) PTS of M-AUn = (RTD_V + PTS_Sync) % 2^32
RTD_V =
If RTP_Vn − RTP_Sync_V < 0: (RTP_Vn − RTP_Sync_V) + 2^32
Else:      (RTP_Vn − RTP_Sync_V) % 2^32
(Audio − optional) PTS of M-AUn = (RTD_A * (90,000 / RTP_clock_rate) + PTS_Sync) % 2^33
RTD_A =
If RTP_An − RTP_Sync_A < 0: (RTP_An − RTP_Sync_A) + 2^32
Else:      (RTP_An − RTP_Sync_A) % 2^32

To synchronize the left and right images based on the PCR, the RTP timestamp of each AU included in the additional view content stream in accordance with the MDTV may require restoration to a form of which a presentation point is calculated based on the PCR, for example, a PTS of each AU included in the main content stream in accordance with the ATSC main broadcast standard.

According to an exemplary embodiment, as shown in Equation 1, in a video stream, the content reproduction apparatus 202 calculates a timestamp difference (RTD_V) between an RTP_Timestamp (RTP_V$_n$) of an AU M-AU$_n$ included in the additional view content stream of which the playback time is to be reproduced and the RTP_Timestamp (RTP_Sync_V) of the AU as the synchronization reference. Subsequently, the content reproduction apparatus 202 adds the calculated timestamp difference (RTD_V) and the ITS (PTS_Sync) of the AU as the synchronization reference and subjects the addition result to a 2^32 modulo operation. Through this process, the content reproduction apparatus 202 may convert the RTP timestamp of each AU included in the additional view content stream in accordance with the MDTV into a timestamp (PTS of M-AU$_n$) in a form of which the presentation point is calculated based on the PCR.

In the present embodiment, in an audio stream, the content reproduction apparatus 202 calculates a timestamp difference (RTD_A) between an RTP_Timestamp (RTP_A$_n$) of an AU M-AU$_n$ included in the additional view content stream of which the playback time is to be reproduced and the RTP_Timestamp (RTP_Sync_A) as the synchronization reference. Subsequently, the content reproduction apparatus 202 multiplies the calculated timestamp difference (RTD_A) by a ratio (90,000//RTP_clock_rate) of a PTS resolution (90,000) to an RTP_Timestamp resolution (RTP_clock_rate) of the audio stream additional view content stream in the additional view content stream. Then, the content reproduction apparatus 202 adds a result of multiplying RTD_A by 90,000/RTP_clock_rate to the PTS (PTS_Sync) of the AU as the synchronization reference, followed by a 2^32 modulo operation. Through this process, the content reproduction apparatus 202 may convert the RTP timestamp of the AU included in the additional view content stream in accordance with the MDTV into a timestamp (PTS of M-AU$_n$) in a form of which the presentation point is calculated based on the PCR.

According to an exemplary embodiment, when RTP_V$_n$ is less than RTP_Sync_V, the content reproduction apparatus 202 uses (RTP_V$_n$−RTP_Sync_V)+2^32 in calculating RTD_V to prevent a rollover of the timestamp. When RTP_V$_n$ is RTP_Sync_V or greater, the content reproduction apparatus 202 uses (RTP_V$_n$−RTP_Sync_V) % 2^32 for calculating RTD_V.

Further, according to an exemplary embodiment, when RTP_A$_n$ is less than RTP_Sync_A, the content reproduction apparatus 202 uses (RTP_A$_n$−RTP_Sync_A)+2^32 in calculating RTD_A to prevent a rollover of the timestamp. When RTP_A$_n$ is RTP_Sync_A or greater, the content reproduction apparatus 202 uses (RTP_A$_n$−RTP_Sync_A) % 2^32 in calculating RTD_A.

In the audio stream, when only an MDTV high efficiency-advanced audio coding (HE-AAC) stream is used, the content reproduction apparatus 202 performs the aforementioned playback time restoration process. When an AC3 audio loaded into the main content stream in accordance with the ATSC main broadcast standard is used, the content reproduction apparatus 202 may omit the aforementioned process of restoring the playback time of the AU. Further, in the audio stream, a process of calculating the timestamp (RTP_Sync_A) of the AU as the synchronization reference may be omitted.

In FIGS. 3 and 4, suppose that an AU1 and an M-AU1 are AUs as a synchronization reference.

For composing a 3D image, the content reproduction apparatus 202 may use a timestamp (PTS of M-AU$_n$) in a form, of which the presentation point is calculated based on the PCR by Equation 1, for calculating a presentation time of an MDTV image. Further, the content reproduction apparatus 202 uses the PTS of the main content stream in accordance with the ATSC main broadcast standard for the presentation time of the ATSC main image and the PCR of the ATSC main image stream as a reference clock. In this instance, the left and right images having the same PTS and PTS of M-$AU_n$ are output at the same time for composing the 3D image. Here, when the timestamps of the streams of the left and right images have different lengths, a comparison of low-order bits of the timestamps is performed based on the shorter timestamp among the timestamps of the left and right images. In the foregoing example, since the PTS is 33 bits and the RTP timestamp is 32 bits, only lower-order 32 bits of the converted PTS of the right image (PTS of M-AUn) and the PTS of the left image are compared.

Equation 1 may be also applied when the main content stream and the additional view content stream use timestamps in the same form based on different reference clocks. For example, when the streams of the left and right images use a PTS based on different reference clocks (PCR), and PTS1_Sync and PTS2_Sync_V as synchronization information, the PTS and the RTP of Equation 1 may be replaced by PTS1 and PTS2. Here, Equation 1 may be changed into Equation 2.

[Equation 2]

(Video) Converted PTS from PTS2 = (PTD_V + PTS1_Sync) % $2^{33}$
PTD_V =
If PTS2_Vn − PTS2 _Sync_V < 0 :   (PTS2_Vn − PTS2_Sync_V) + $2^{33}$
Else:      (PTS2_Vn − PTS2_Sync_V) % $2^{33}$ Equation 2 is used to convert PTS2 into a form of which a presentation point is calculated based on the PCR of a stream including PTS1, which uses the same manner as the PTS-RTP conversion method in Equation 1 described above. However, since the left and right images have the same timestamp length of 33 bits, a $2^{33}$ modulo operation is used to prevent a rollover.

B. Restoration of Playback Time Based on NTP Reference Clock

Restoration of the playback time based on the NTP reference clock may be carried out on the basis of Equation 3.

[Equation 3]

Presentaion Time of Aun (NTP Clock Timestamp) =
    RTCP_SR_NTP_TIMESTAMP + (((PTD + RTP_Sync) % $2^{33}$) − RTCP_5R_RTP_ TIMESTAMP) / 90,000
    PTD =
    If PTSn − PTS_Sync < 0 :    (PTSn − PTS_Sync) + $2^{33}$
    Else:          (PTSn − PTS_Sync) % $2^{33}$ The main content stream in accordance with the conventional ATSC main broadcast standard may transmit an AU in a PES packet. Here, a PTS included in each PES packet header is used to calculate a PTS of the AU loaded into the packet based on the PCR.

To synchronize the left and right images based on the NTP reference clock, conversion of a PTS of each AU transmitted through the main content stream in accordance with the ATSC main broadcast standard into a 64-bit NTP timestamp is necessary.

In an exemplary embodiment of the present invention, the content reproduction apparatus 202 may calculate a timestamp difference (PTD) between a PTS ($PTS_n$) of an AU ($AU_n$) included in the main content stream in accordance with the ATSC main broadcast standard of which a playback time is to be reproduced and a PTS (PTS_Sync) of an AU as a synchronization reference. Subsequently, the content reproduction apparatus 202 adds the calculated timestamp difference (PTD) and an RTP timestamp (RTP_Sync) of an AU as a synchronization reference and subjects the addition result to a $2^{33}$ modulo operation. A result obtained through this process may be set as the RTP timestamp of the AU included in the main content stream in accordance with the ATSC main broadcast standard. The content reproduction apparatus 202 may calculate a presentation time of the AU included in the main content stream depending on a method of obtaining an NTP timestamp from the RTP timestamp in the conventional MDTV broadcast standard.

As shown in Equation 3, when $PTS_n$ is less than PTS_Sync, the content reproduction apparatus 202 may use ($PTS_n$−PTS_Sync)+$2^{33}$ in calculating the PTD to prevent a rollover of the timestamp. When $PTS_n$ is PTS_Sync or greater, the content reproduction apparatus 202 may use ($PTS_n$−PTS_Sync) % $2^{33}$ in calculating the PTD.

When an AC3 audio loaded into the main content stream in accordance with the ATSC main broadcast standard is used, the content reproduction apparatus 202 may perform the aforementioned playback time restoration process. When an HE-AAC audio loaded into the additional view content stream in accordance with the MDTV is used, the content reproduction apparatus 20 may omit the aforementioned playback time restoration process.

In FIGS. 3 and 4, suppose that the AU1 and the M-AU1 are AUs as a synchronization reference. For composing a 3D image, the content reproduction apparatus 202 may use a timestamp (presentation time of $AU_n$ (NTP clock timestamp)) in a form, of which the presentation point is calculated based on the NTP clock reference by Equation 3, so as to calculate a presentation time of an ATSC main image. Further, the content reproduction apparatus 202 uses the RTP timestamp of the additional view content stream in accordance with the MDTV for the presentation point of an MDTV additional view image and the NTP clock through the MDTV image stream as a reference clock. Calculating the presentation time of the RTP timestamp in the additional view image stream based on the NTP clock is carried out based on a method of converting the RTP timestamp into the presentation time based on the NTP clock.

In another embodiment based on the NTP clock as a reference clock, a timestamp is first converted by Equation 1 and then converted into an NTP clock form. In this instance, the PTS of the left image is converted into an RTP timestamp by Equation 1, and then the RTP timestamp is converted into an NTP timestamp based on a conventional RTP model. Here, PTS and RTP values may be calculated by Equation 4 modified from Equation 1.

[Equation 4]

(Video)RTP timestamp of AUn = (PTD_V + RTP_Sync_V) % $2^{32}$
PTD_V =
If PTSn − PTS_Sync < 0 :    (PTSn − PTS_Sync) + $2^{32}$
Else:       (PTSn − PTS_Sync) % $2^{32}$ The timestamp conversion method shown in FIG. 4 may be also applied to conversion between the timestamps of the streams of the left and right images using the RTP timestamps having different reference clocks. In this case, a timestamp is first converted and then converted into an NTP clock form based on the conventional RTP model.

Figure 5:
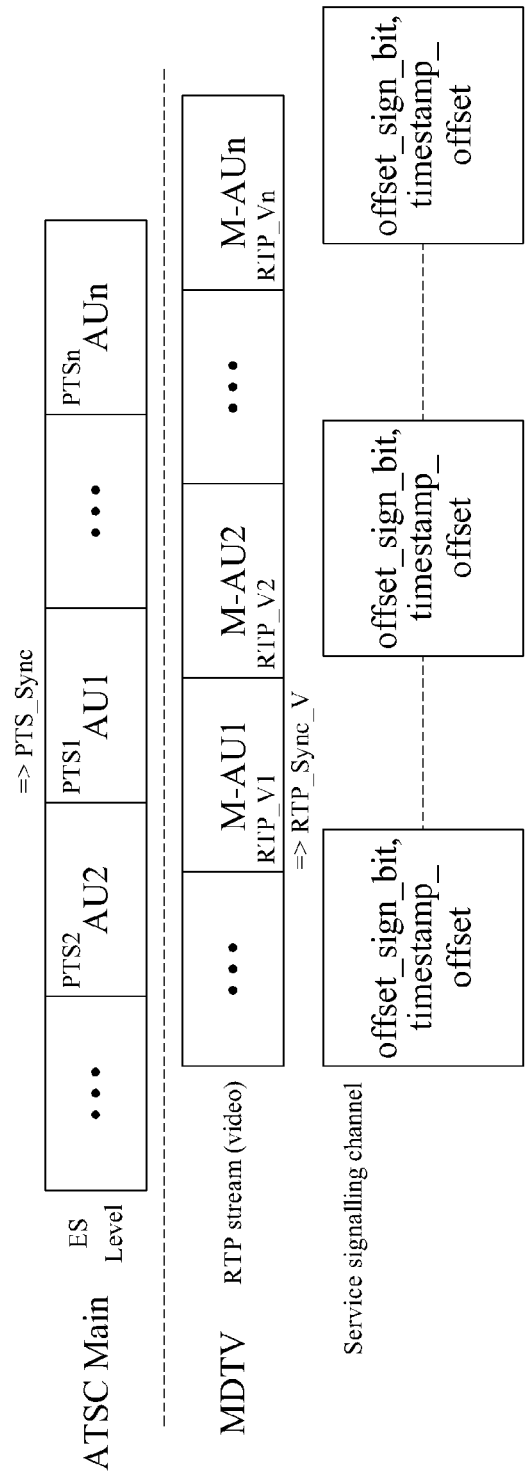
FIG. 5 illustrates a synchronization process based on a timestamp offset mode using an MDTV signaling channel according to a second exemplary embodiment of the present invention.

FIG. 5 illustrates a synchronization process based on the timestamp offset mode using an MDTV signaling channel according to a second exemplary embodiment of the present invention.

As described above, a timestamp offset between timestamps corresponding to AUs of left and right images to be synchronized is generated as the synchronization information. In detail, the synchronization information is a timestamp offset related to a difference between a PTS of the AU of the left image and an RTP timestamp of the AU of the additional view content stream at a synchronization time.

For a 3DTV service, the content reproduction apparatus 202 may use the timestamp offset corresponding to the AUs of the left and right images to be output at the same particular time as synchronization information and convert a timestamp of content to be reproduced into a proper form for a reference clock using the synchronization information in restoration. In this instance, the content reproduction apparatus 202 converts the PTS of the left image (ATSC-Main) into an NTP timestamp form when the NTP clock of the MDTV is used as a restoration reference clock for a 3D reproduction. Further, the content reproduction apparatus 202 converts the RTP timestamp of the right image (MDTV) into a PTS form when a PCR clock is used as the restoration reference clock. Here, a signaling parameter associated with the timestamp offset includes offset_sign_bit and timestamp_offset.

The generated synchronization information may be multiplexed through a signaling channel of a main content stream in accordance with the ATSC main broadcast standard or a additional view content stream in accordance with the MDTV broadcast standard and transmitted to the content reproduction apparatus 202. When the synchronization information is transmitted through a signaling channel of the additional view content stream in accordance with the MDTV broadcast standard, the synchronization information may be inserted into the signaling channel, such as a service level descriptor or a component level descriptor included in an FIC, an SMT and an SLT loaded into an RS frame and transmitted periodically. When the synchronization information is multiplexed through the signaling channel of the main content stream in accordance with the ATSC main broadcast standard, the content providing apparatus 201 may use a descriptor of PSI or PSIP tables, such as a PMT, a VCT and an EIT, loaded into an MPEG-2 TS packet and periodically transmitted.

Here, the content reproduction apparatus 202 may restore a playback time of each AU included in the main content stream in accordance with the ATSC main broadcast standard or the additional view content stream in accordance with the MDTV broadcast standard using an NTP reference clock or a PCR. For example, when synchronization is carried out in accordance with the PCR, the playback time restoration unit 206 may convert the RTP timestamp of the AU included in the additional view content stream into timing information in a PTS form used in the MPEG-2 system standard. When synchronization is carried out in accordance with the NTP reference clock, the playback time restoration unit 206 may convert the PTS of the AU included in the main content stream into timing information in an NTP timestamp form or RTP timestamp form used in the MDTV standard. This playback time restoration process makes it possible to output the main content stream and the additional view content stream in accordance with a single reference clock, that is, the PCR or NTP clock. Accordingly, the left and right images of the main content stream and the additional view content stream mutually matched may be output at the same time in accordance with the corresponding reference clock.

A timestamp offset mode according to an exemplary embodiment of the present invention will be configured in a combination as follows.

(i) Multiplexing of synchronization information through main content stream in accordance with ATSC main broadcast standard—Restoration of playback time based on NTP reference clock (ii) Multiplexing of synchronization information through main content stream in accordance with ATSC main broadcast standard—Restoration of playback time based on PCR (iii) Multiplexing of synchronization information through additional view content stream in accordance with MDTV broadcast standard—Restoration of playback time based on NTP reference clock (iv) Multiplexing of synchronization information through additional view content stream in accordance with MDTV broadcast standard—Restoration of playback time based on PCR Similarly to FIG. 3, FIG. 5 illustrates multiplexing the synchronization information through the additional view content stream in accordance with the MDTV broadcast standard. In FIG. 5, the main content stream in accordance with the ATSC main broadcast standard includes a plurality of AUs ($AU_n$). Here, each AU has a PTS. Also, the additional view content stream transmitted in accordance with the MDTV broadcast standard may include a plurality of AUs (M-$AU_n$), and each AU has an RTP timestamp.

In FIG. 5, PTS represents a $PTS_n$ of an access unit $AU_n$, and $RTP\_V_n$ represents an RTP timestamp of an access unit M-$AU_n$ in a video stream. Further, PTS_Sync represents the PTS among the timestamps corresponding to the AUs of the left and right images to be output simultaneously at a particular synchronization time as a synchronization reference. RTP_Sync represents the RTP timestamp among the timestamps corresponding to the AUs of the left and right images to be output simultaneously at the particular synchronization time as the synchronization reference. Here, the particular synchronization time as the synchronization reference can be a arbitrary time between the start and the end of a 3D program. For example, the particular synchronization time as the synchronization reference may be at a start of a program. Alternatively, the synchronization time may be a intermediate point of the program. However, when the synchronization information is not generated in advance like a live broadcast, the synchronization information may be generated at a start of the program.

In the timestamp offset mode, an absolute value and a sign of a timestamp offset, which is a difference between PTS_Sync of the AU as a synchronization reference in the main content stream in accordance with the ATSC main broadcast standard and RTP_Sync of the AU as a synchronization reference in the additional view content stream in accordance with the MDTV broadcast standard, are used as synchronization information. Calculation of PTS_Sync and RTP_Sync is described above with reference to FIG. 3. Once the absolute value and the sign of the timestamp offset are calculated, PTS_Sync and RTP_Sync may be stored and used as the synchronization information for a period during which any of time bases of the main content stream corresponding to the left image and the additional view content stream corresponding to the right image is not changed. In the timestamp offset mode, timestamp_offset and offset_sign_bit as the synchronization information may be multiplexed and transmitted to the content reproduction apparatus 202.

Referring to FIG. 5, the content providing apparatus 201 may multiplex the synchronization information by including the timestamp offset as the synchronization information in the additional view content stream in accordance with the MDTV broadcast standard as signaling information. Here, when the content providing apparatus 201 transmits the synchronization information through the signaling channel of the additional view content stream in accordance with the MDTV broadcast standard, the synchronization information may be inserted into the signaling channel, such as a service level descriptor or a component level descriptor included in an FIC, an SMT and an SLT loaded into an RS frame and transmitted periodically.

Figure 6:
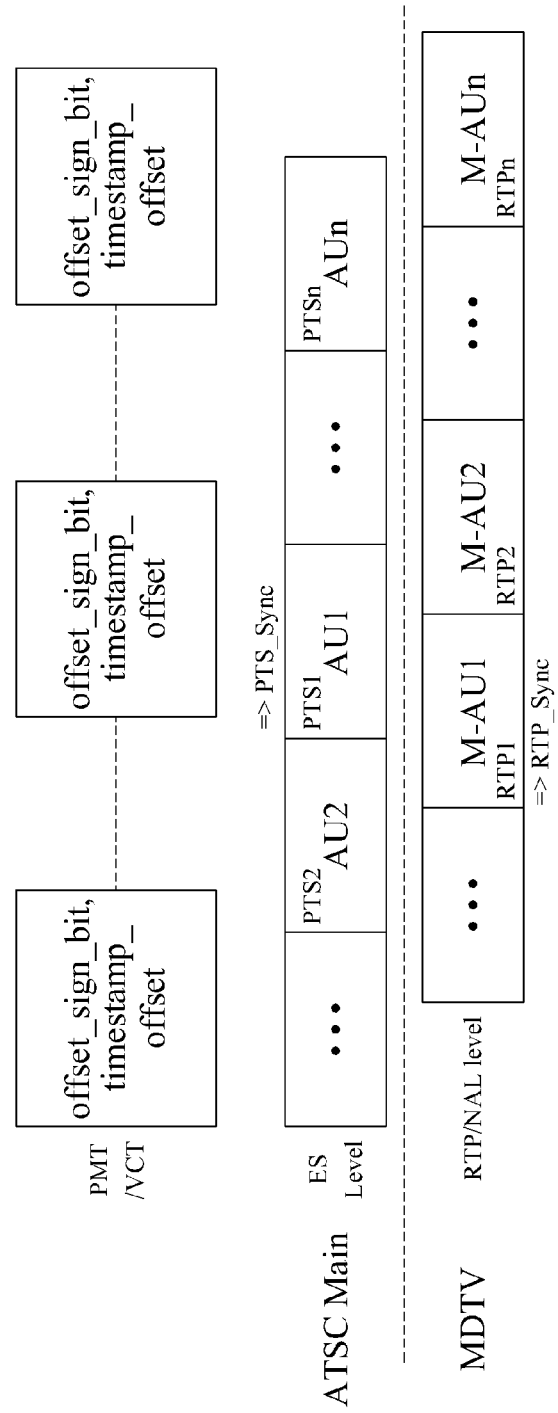
FIG. 6 illustrates a synchronization process based on the timestamp offset mode using an ATSC main signaling channel according to the second exemplary embodiment of the present invention.

FIG. 6 illustrates a synchronization process based on the timestamp offset mode using an ATSC main broadcast signaling channel according to a second exemplary embodiment of the present invention.

Referring to FIG. 6, the content providing apparatus 201 may multiplex the synchronization information by including the timestamp offset as the synchronization information in the main content stream in accordance with the ATSC main broadcast standard as signaling information. Here, the content providing apparatus 201 may use a descriptor, such as a PMT, a VCT and an EIT, loaded into an MPEG-2 TS packet and transmitted periodically.

Subsequently, the content reproduction apparatus 202 may restore the playback time of the main content stream or the additional view content stream. According to an exemplary embodiment of the present invention, the content reproduction apparatus 202 may restore the playback time based on a PCR or an NTP reference clock.

A. Restoration of Playback Time Based on PCR

Restoration of the playback time based on the PCR may be carried out on the basis of Equation 5.

[Equation 5]

If offset_sign_bit = 0
(Video) PTS of M-AUn = (RTP_Vn + timestamp_offset) % 2^32
Else If offset_sign_bit = 1 {
   if RTP_Vn >= timestamp_offset
      (Video) PTS of M-AUn = RTP_Vn − timestamp_offset
   else if RTP_Vn < timestamp_offset
      (Video) PTS of M-AUn = RTP_Vn − timestamp_offset + 2^32
}

To synchronize the left and right images based on the PCR, the RTP timestamp of each AU included in the additional view content stream in accordance with the MDTV standard may need restoring into a form, of which a presentation point is calculated based on the PCR, for example, a PTS of each AU included in the main content stream in accordance with the ATSC main broadcast standard.

According to an exemplary embodiment, as shown in Equation 5, when offset_sign_bit is 0, the content reproduction apparatus 202 may subject a result of adding RTP_Timestamp (RTP_V$_n$) of the AU (M-AU$_n$) included in the additional view content stream, of which a playback time is to be restored, and a timestamp offset of the AU as the synchronization reference to a 2^32 module operation. Then, the content reproduction apparatus 202 may calculate a timestamp (PTS of M-AU$_n$) of each AU included in the additional view content stream in accordance with the MDTV standard in a form of which the presentation point is calculated based on the PCR. Here, when offset_sign_bit is 0, the timestamp offset is positive. When offset_sign_bit is 1, the timestamp offset is negative.

According to an exemplary embodiment, when offset_sign_bit is 1 and RTP_V$_n$ is the timestamp offset or greater, the content reproduction apparatus 202 uses RTP_V$_n$−timestamp_offset in calculating the timestamp in a PTS form, which is the PCR-based playback time of the AU included in the additional view content stream. When offset_sign_bit is 1 and RTP_V$_n$ is less than the timestamp offset, the content reproduction apparatus 202 uses RTP_V$_n$−timestamp_offset+2^32 in calculating the PTS corresponding to the playback time of the AU included in the additional view content stream.

In FIGS. 5 and 6, suppose that an AU1 and an M-AU1 are AUs as a synchronization reference. For composing a 3D image, the content reproduction apparatus 202 may use a timestamp (PTS of M-AU$_n$) in a form, of which the presentation point is calculated based on the PCR by Equation 5, for calculating a presentation time of an MDTV image. Further, the content reproduction apparatus 202 uses the PTS of the main content stream in accordance with the ATSC main broadcast standard for the presentation time of the ATSC main image and the PCR of the ATSC main image stream as a reference clock. In this instance, the left and right images having the same PTS and PTS of M-AU$_n$ are output simultaneously for composing the 3D image. Here, when the timestamps of the streams of the left and right images have different lengths, low-order bits of the timestamps are compared based on the shorter timestamp among the timestamps of the left and right images. In the foregoing example, since the PTS is 33 bits and the RTP timestamp is 32 bits, only lower-order 32 bits of the converted PTS of the right image (PTS of M-AUn) and the PTS of the left image are compared.

Equation 5 may be also applied when the streams of the left and right images use timestamps in the same form based on different reference clocks. For example, when the streams of the left and right images use a PTS based on different reference clocks (PCR), and PTS1_Sync and PTS2_Sync_V as synchronization information, the PTS and the RTP of Equation 5 may be replaced by PTS1 and PTS2. Here, Equation 5 may be changed into Equation 6.

[Equation 6]

If offset_sign_bit = 0
(Video) Converted PTS from PTS2 = (PTS2_Vn + timestamp_offset) % 2^33
Else If offset_sign_bit = 1 {
   if RTP_Vn >= timestamp_offset
      (Video) Converted PTS from PTS2 = PTS2_Vn − timestamp_offset
   else if RTP_Vn < timestamp_offset
      (Video) Converted PTS from PTS2 = PTS2_Vn − timestamp_offset + 2^33
}

Equation 6 is used to convert PTS2 into PTS1 for using a PCR of a stream using PTS1 as a reference clock, which uses the same manner as the PTS-RTP conversion method in Equation 5 described above. However, since the left and right images have the same timestamp length of 33 bits, a 2^33 modulo operation is used to prevent a rollover.

B. Restoration of Playback Time Based on NTP Reference Clock

Restoration of the playback time based on the NTP reference clock may be carried out on the basis of Equation 7.

[Equation 7]

If offset_sign_bit = 1
(Video) RTP_AUn = (PTSn%2^32 + timestamp_offset) % 2^32
Else If offset_sign_bit = 0 {
   if PTSn%2^32 >= timestamp_offset
      (Video) RTP_AUn = PTSn%2^32 − timestamp_offset
   else if PTSn%2^32 < timestamp_offset
      (Video) RTP_AUn = PTSn%2^32 − timestamp_offset + 2^32
}

To synchronize the left and right images based on the NTP reference clock, conversion of a PTS of each AU loaded into the main content stream in accordance with the ATSC main broadcast standard into a 64-bit NTP timestamp form or a 32-bit RTP timestamp form is necessary.

In an exemplary embodiment, when offset_sign_bit is 1, the content reproduction apparatus 202 may obtain a timestamp ($RTP\_AU_n$) of the AU ($AU_n$) for calculation of a presentation time of the AU ($AU_n$) based on the NTP clock, the AU ($AU_n$) being included in the main content stream in accordance with the ATSC main broadcast standard, of which the playback time is to be restored, by subjecting a result obtained by adding a result of a $2^{32}$ modulo operation of the PTS ($PTS_n$) of the AU with the timestamp offset to a $2^{32}$ modulo operation.

When offset_sign_bit is 0 and the result of a $2^{32}$ modulo operation of the PTS ($PTS_n$) of the AU is greater than or equal to the timestamp offset, the content reproduction apparatus 202 may calculate a difference between the result of a $2^{32}$ modulo operation of the PTS ($PTS_n$) of the AU and the timestamp offset as the timestamp ($RTP\_AU_n$) of the AU ($AU_n$) included in the main content stream in accordance with the ATSC main broadcast standard for calculation of the presentation time based on the NTP clock.

When offset_sign_bit is 0 and the result of a $2^{32}$ modulo operation of the PTS ($PTS_n$) of the AU is less than the timestamp offset, the content reproduction apparatus 202 may extract a result by adding the difference between the result of a $2^{32}$ modulo operation of the PTS ($PTS_n$) of the AU and the timestamp offset with $2^{32}$. Through this process, the content reproduction apparatus 202 may calculate the timestamp ($RTP\_AU_n$) of the AU ($AU_n$) included in the main content stream in accordance with the ATSC main broadcast standard for calculation of the presentation time based on the NTP clock.

The presentation time of the $AU_n$ in the NTP timestamp form may be obtained by converting an RTP timestamp into a presentation time based on the NTP clock, considering the timestamp ($RTP\_AU_n$) for calculation of the presentation time based on the NTP clock as the RTP timestamp. Here, conversion of an RTP timestamp into a NTP timestamp form may be carried out based on the existing methods in RTP specifications.

In FIGS. 5 and 6, suppose that the AU1 and the M-AU1 are AUs as a synchronization reference. For composing a 3D image, the content reproduction apparatus 202 may convert PTS of an AUn into a timestamp (presentation time of $AU_n$ (NTP clock timestamp)) in a form, of which the presentation point is calculated based on the NTP clock reference by Equation 7, for calculating a presentation time of an ATSC main image. Further, the content reproduction apparatus 202 uses the RTP timestamp of the additional view content stream in accordance with the MDTV standard for the presentation point of an MDTV additional view image and the NTP clock through the MDTV image stream as a reference clock. Calculating the presentation time of the RTP timestamp in the additional view image stream based on the NTP clock is carried out based on the existing methods of converting the RTP timestamp into the presentation time based on the NTP clock.

This timestamp conversion method may be also applied to conversion between the timestamps of the streams of the left and right images using the RTP timestamps having different reference clocks. In this case, a timestamp is first converted to calculate the presentation time based on a reference clock of one stream among the two streams and then the obtained timestamp in RTP timestamp form is converted into an NTP timestamp form based on the conventional RTP model.

In the third exemplary embodiment of the present invention described above, the synchronization information consists of two separate fields, offset sign bit and timestamp offset, but the synchronization information may use one single field in a form of data which includes both the sign information and the absolute value of the difference, such as two's complement data. Even in this case, the method of the present invention can be easily applied after exactracting the sign information and the absolute value of the difference from the synchronization information.

Figure 7:
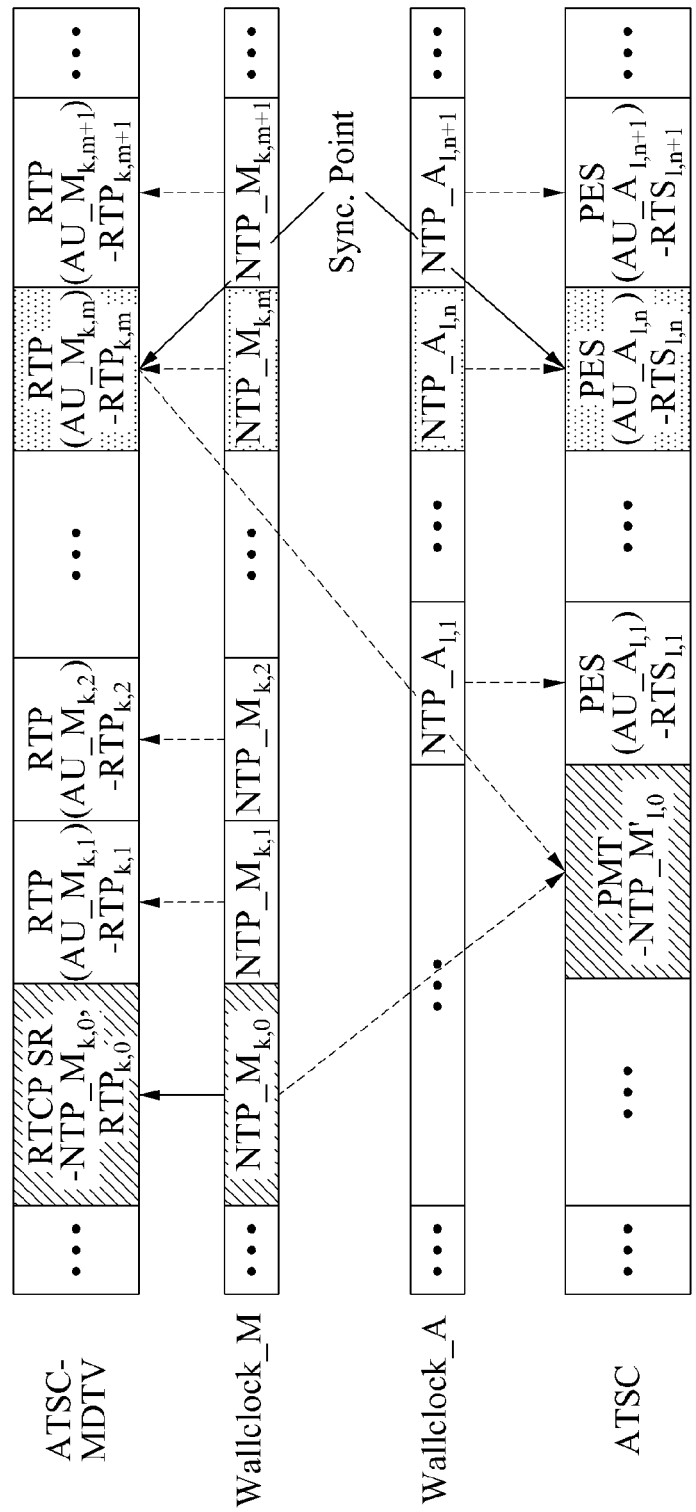
FIG. 7 illustrates an NTP synchronization mode according to a third exemplary embodiment of the present invention.

FIG. 7 illustrates an NTP synchronization mode according to a third exemplary embodiment of the present invention.

In the NTP synchronization mode, synchronization information is additionally generated using a first timestamp corresponding to an AU of a left image and a second timestamp corresponding to an AU of a right image based on a reference timestamp. Here, the reference timestamp is an NTP timestamp, and the synchronization information is expressed as an NTP timestamp.

As described above, in the NTP synchronization mode, an NTP timestamp (NTP_M') as synchronization information generated for synchronization of a main content stream and a additional view content stream is further transmitted in addition to a PTS of the main content stream in accordance with the ATSC main broadcast standard and an RTP timestamp of the additional view content stream in accordance with the MDTV broadcast standard. Here, the NTP timestamp is 64-bits.

In FIG. 7, $NTP\_M_{k,m}$ is Wallclock_M as an NTP reference clock associated with the additional view content stream, and $NTP\_A_{l,n}$ is Wallclock_A as an NTP reference clock associated with the main content stream. Wallclock_M and Wallclock_A are reference clocks synchronized in advance and periodically transmitted through the additional view content stream and the main content stream. $RTP_{k,m}$ is an RTP timestamp of an AU constituting the additional view content stream. $PTS_{l,n}$ is a PTS of an AU constituting the main content stream. Here, k is 0, 1, 2, [ . . . ], and m and n is 1, 2, 3, [ . . . ]. R is a resolution of a timestamp, for example, an RTP timestamp and a PTS, which is 90,000 in the present invention. O_M is a random offset, which is 32 bits.

A. Generation of Synchronization Information

The content providing apparatus 201 may obtain $RTP_{k,m}$ using $NTP\_M_{k,m}$ of Wallclock_M as the NTP timestamp according to Equation 8. Also, the content providing apparatus 201 may obtain $PTS\_A_{l,n}$ from $NTP\_A_{l,n}$ of Wallclock_A as the NTP timestamp according to Equation 9. Here, $RTP_{k,m}$ is the RTP timestamp of the additional view content stream in accordance with the MDTV broadcast standard, and $PTS\_A_{l,n}$ is the PTS of the main content stream in accordance with the ATSC main broadcast standard.

$$RTP_{k,m}=(R*NTP\_M_{k,m}/(2^{32})+O\_M) \%(2^{32}) \quad \text{[Equation 8]}$$

$$PTS_{l,n}=(R*NTP\_A_{l,n}/(2^{32}))\%(2^{33}) \quad \text{[Equation 9]}$$

For example, the content providing apparatus 201 may generate the NTP timestamp (NTP_M') as synchronization information for synchronization of the main content stream and the additional view content stream using the PTS of the main content stream and the RTP timestamp of the additional view content stream. In this case it is assumed that the main content stream in accordance with the ATSC main broadcast standard and the additional view content stream in accordance with the MDTV broadcast standard are synchronized with each other based on the NTP reference clock.

Referring to FIG. 7, a PTS ($PTS\_M_{k,m}$) corresponding to an AU, $AU\_A_{l,n}$, of the main content stream corresponding to the left image and a PTS ($PTS\_A_{l,n}$) converted from an RTP timestamp corresponding to an AU, $AU\_M_{k,m}$, of the additional view content stream corresponding to the right image at a particular synchronization time are the same. That is, $PTS\_M_{k,m}=PTS\_A_{l,n}$. When Equations 8 and 9 are applied under such a condition, Equation 10 is obtained.

$$NTP\_M'_{l,0}=NTP\_M_{k,0}+\{((RTP'_{k,m}-RTP_{k,0})-PTS_{l,n})/R\}*(2^{32}) \quad \text{[Equation 10]}$$

Here, $NTP\_M'_{l,0}$ is synchronization information for synchronization of the main content stream and the additional view content stream.

B. Multiplexing of Synchronization Information

Referring to FIG. 7, $NTP\_M'_{l,0}$ is a 64-bit NTP timestamp to used as the synchronization information that may be inserted into the main content stream in accordance with the ATSC main broadcast standard as signaling information and transmitted to the content reproduction apparatus 202. In detail, the synchronization information may be inserted as a descriptor transmitted periodically to the main content stream. Here, when the synchronization information ($NTP\_M'_{l,0}$) is inserted as the signaling information of the main content stream, the synchronization information may be inserted as a descriptor, such as a PMT, a VCT, and an EIT.

Alternatively, $NTP\_M'_{l,0}$ is a 64-bit NTP timestamp to be used as the synchronization information that may be inserted into the additional view content stream in accordance with the MDTV broadcast standard as signaling information and transmitted to the content reproduction apparatus 202. In detail, the synchronization information may be inserted as a descriptor periodically transmitted to the additional view content stream. Here, when the synchronization information ($NTP\_M'_{l,0}$) is inserted as the signaling information of the additional view content stream, the synchronization information may be inserted as a descriptor into a signaling table, such as a FIC, an SMT and an SLT.

C. Demultiplexing of Synchronization Information

The content reproduction apparatus 202 may extract the synchronization information from the signaling information of the main content stream in accordance with the ATSC main broadcast standard or the signaling information of the additional view content stream in accordance with the MDTV broadcast standard. For example, the content reproduction apparatus 202 may extract the synchronization information from a PSI or a PSIP, such as a PMT, a VCT and an EIT, loaded into an MPEG-2 TS packet and periodically transmitted in the main content stream in accordance with the ATSC main broadcast standard. Alternatively, the content reproduction apparatus 202 may extract the synchronization information from an FIC, an SMT and an SLT periodically transmitted in the additional view content stream in accordance with the MDTV broadcast standard.

Further, the content reproduction apparatus 202 may demultiplex the main content stream transmitted in accordance with an MPEG-TS transmission protocol. Also, the content reproduction apparatus 202 may demultiplex the additional view content stream transmitted in accordance with an A/153 MDTV IP/RTP transmission protocol.

D. Restoration Playback Time

The content reproduction apparatus 202 may restore a playback time of the main content stream in accordance with the ATSC main broadcast standard or a playback time of the additional view content stream in accordance with the MDTV broadcast standard using the synchronization information.

For example, the content reproduction apparatus 202 may restore the playback time of the main content stream, for example, a PTS ($PTS\_A_{l,n}$), using the NTP timestamp ($NTP\_M'_{l,0}$) as the synchronization information and a PTS ($TPS'_{l,n}$) generated from Wallclock_A associated with the main content stream. Here, the content reproduction apparatus 202 may restore the PTS as the playback time of the main content stream considering whether the PTS generated from the NTP reference clock is reversed by a B-frame or a rollover. Accordingly, the content reproduction apparatus 202 may restore the PTS ($PTS\_A_{l,n}$) corresponding to the playback time of the main content stream based on Equation 11.

[Equation 11]

$$PTS\_A_{l,n} = R * NTP\_M'_{l,0} / (2^{32}) + PTS'_{l,n}$$
$$\text{If}( |PTS_{l,n} - PTS_{l,0}| < \text{Threshold})\ PTS'_{l,n} = PTS_{l,n}, \text{else } PTS'_{l,n} + (2^{33})$$

Alternatively, the content reproduction apparatus 202 may restore the playback time of the additional view content stream, for example, a PTS (PTS_$M_{k,m}$), using the NTP reference clock (NTP_$M_{k,0}$) and an RTP timestamp (RTP'$_{k,m}$, RTP$_{k,0}$) extracted from Wallclock_M associated with the additional view content stream. Here, the content reproduction apparatus 202 may restore the PTS as the playback time of the additional view content stream considering whether the RTP timestamp is reversed by a B-frame or a rollover. Accordingly, the content reproduction apparatus 202 may restore the PTS (PTS_$M_{k,m}$) corresponding to the playback time of the additional view content stream based on Equation 12.

[Equation 12]

$$PTS\_M_{k,m} = R * NTP\_M_{k,0} / (2^{32}) + (RTP'_{k,m} - RTP_{k,0})$$
$$\text{if}( |RTP_{k,m} - RTP_{k,0}| < \text{Threshold})\ RTP'_{k,m} = RTP_{k,m}, \text{else } RTP'_{k,m} = RTP_{k,m} + (2^{32})$$

Hereinafter, cases in which synchronization information for synchronization of a main content stream corresponding to a left image and a additional view content stream corresponding to a right image is transmitted and a playback time is restored based on the synchronization information will be illustrated.

CASE 1: Wallclock_M and Wallclock_A are synchronized but an offset is not 0.

In a case 1, Wallclock_M in accordance with a mobile broadcast, the MDTV standard, and Wallclock_A in accordance with a stationary broadcast, the ATSC main broadcast standard, are synchronized, while an offset is not 0. That is, in the case 1, an ATSC encoder generating the main content stream in accordance with the ATSC main broadcast standard and an ATSC-M/H encoder generating the additional view content stream in accordance with the MDTV broadcast standard use independent Wallclocks.

Here, transmitting the synchronization information, NTP_M'$_{l,0}$, generated by Equation 10 through the main content stream may be mandatory. Further, the content providing apparatus 201 may transmit the synchronization information, NTP_M'$_{l,0}$, to be included in information transmitted periodically, such as, a PMT. To generate the synchronization information, NTP_M'$_{l,0}$, the content providing apparatus 201 may use NTP_$M_{k,0}$ and RTP$_{k,0}$ of previous PTCP SR the closest to RTP$_{k,m}$ and AU_$M_{k,m}$. In this case, the content reproduction apparatus 202 may synchronize the main content stream corresponding to the left image and the additional view content stream corresponding to the right image using Equations 9 and 10.

CASE 2: NTP_M and NTP_A are synchronized and an offset is 0.

In a case 2, NTP_M and NTP_A are synchronized and an offset is 0. In this instance, an ATSC encoder generating the main content stream in accordance with the ATSC main broadcast standard and an ATSC-M/H encoder generating the additional view content stream in accordance with the MDTV broadcast standard use a single Wallclock. Here, transmitting the synchronization information, NTP_M'$_{l,0}$, generated by Equation 10 through the main content stream may be optional.

Here, when the synchronization information, NTP_M'$_{l,0}$, is transmitted, the content reproduction apparatus 202 may synchronize the left image and the right image using Equations 11 and 12 in the same manner as the offset being a non-zero value.

When the synchronization information, NTP_M'$_{l,0}$, is not transmitted, the content reproduction apparatus 202 may perform synchronization as follows, provided that Wallclock_M and Wallclock_A are matched.

For example, the content reproduction apparatus 202 may synchronize the main content stream and the additional view content stream using a relationship "PTS_$M_{k,m}$ & 0x1FFFFFFFF==PTS_$A_{l,n}$." Further, the content reproduction apparatus 202 may calculate the synchronization information, NTP_M'$_{l,0}$, generated by Equation 10 and synchronize the main content stream and the additional view content stream in the same manner as when the offset is not 0.

Figure 8:
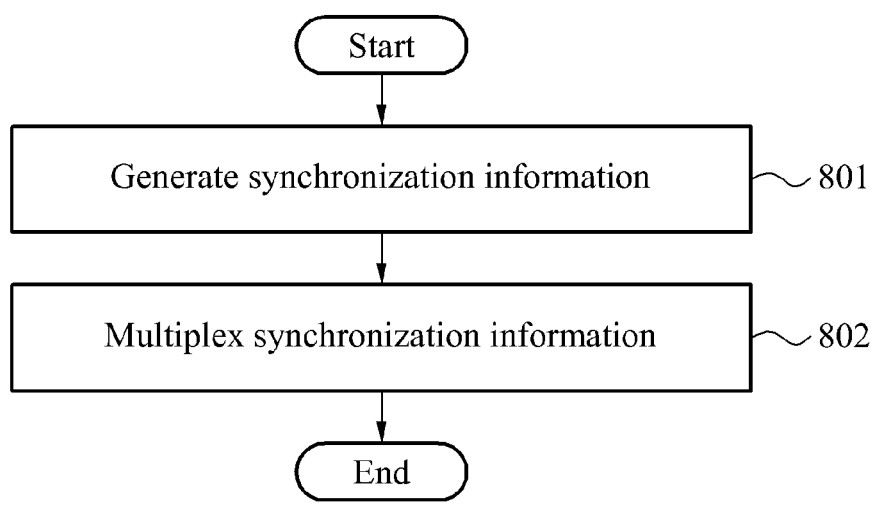
FIG. 8 illustrates a content providing method carried out by a content providing apparatus according to an exemplary embodiment of the present invention.

FIG. 8 illustrates a content providing method carried out by a content providing apparatus according to an exemplary embodiment of the present invention.

In operation 801, the content providing apparatus 201 may generate synchronization information to match playback times of AUs of left and right images. In the present embodiment, (i) a timestamp pairing mode, (ii) a timestamp offset mode, and (iii) an NTP synchronization mode may be used. In the present invention, the left and right images are transmitted in accordance with different broadcast standards and use different timing models or the same timing model using different reference clocks. Thus, the synchronization information according to the present embodiment may be generated based on the left and right images having different timing models or reference clocks. (i) The timestamp pairing mode, (ii) the timestamp offset mode, and (iii) the NTP synchronization mode will be described in detail with reference to FIGS. 10 to 15.

In operation 802, the content providing apparatus 201 may multiplex the synchronization information. In detail, the content providing apparatus 201 may transmit a main content stream of the left image and a additional view content stream of the right image, that are encoded, to the content reproduction apparatus 202. Here, the content providing apparatus 201 may multiplex the synchronization information by inserting the synchronization information into signaling information on the main content stream or the additional view content stream.

Figure 9:
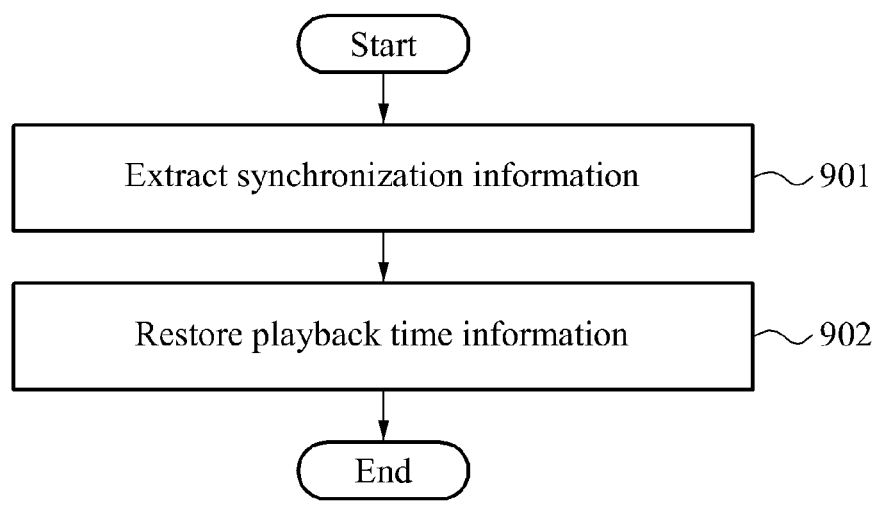
FIG. 9 illustrates a content reproduction method carried out by a content reproduction apparatus according to an exemplary embodiment of the present invention.

FIG. 9 illustrates a content reproduction method carried out by a content reproduction apparatus according to an exemplary embodiment of the present invention.

In operation 901, the content reproduction apparatus 202 may extract synchronization information from a main content stream of a left image and a additional view content stream of a right image that are encoded. In detail, the content reproduction apparatus 202 may extract the synchronization information inserted into signaling information on the main content stream of the left image and the additional view content stream of the right image.

In operation 902, the content reproduction apparatus 202 may restore a playback time of an AU included in the main content stream and a playback time of an AU included in the additional view content stream using the extracted synchronization information.

In the present invention, a main content stream corresponds to a left image, while a additional view content stream corresponds to a right image, without being limited thereto. Alternatively, the left image and the right image may replace each other. Further, the present invention may be applied to not only an image but also to audio. Generally, a playback time of a additional view image transmitted through a broadcast network may not be synchronized with that of a main view image transmitted through the broadcast network. Thus, transmission of synchronization information for synchronizing the main view image and the additional view image at a particular synchronization time for synchronizing and reproducing the main view image and the additional view image in a frame unit in the form of an AU, would be necessary. Here, the main view image may correspond to a left image for a 3DTV service, and the additional view image may correspond to a right image.

Figure 10:
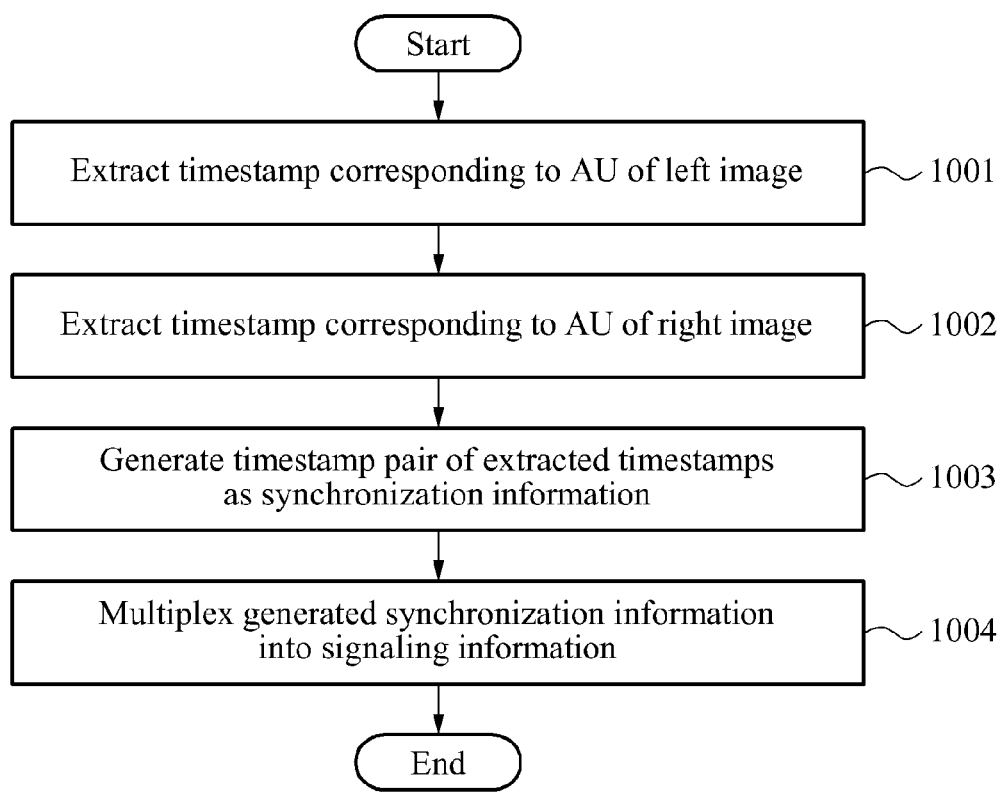
FIG. 10 illustrates a content providing method based on the timestamp pairing mode according to the first exemplary embodiment of the present invention.

FIG. 10 illustrates a content providing method based on the timestamp pairing mode according to a first exemplary embodiment of the present invention.

In the timestamp pairing mode, a timestamp of an AU of a left image and a timestamp of an AU of a right image to be output at the same particular time for a 3DTV service are used as synchronization information. In detail, in the timestamp pairing mode, a timestamp pair including a timestamp corresponding to an AU of a left image and a timestamp corresponding to an AU of a right image is used as the synchronization information. The timestamp pair may be extracted in each frame unit in the form of an AU. When the left and right images are transmitted in different broadcast standards, and as a result have different timing models, the timestamp pair may include different forms of timestamps.

In operation 1001, the content providing apparatus 201 may extract a timestamp corresponding to an AU of a left image. For example, when the left image is in accordance with the ATSC main broadcast standard, the timestamp corresponding to the AU of the left image is represented by a PTS.

In operation 1002, the content providing apparatus 201 may extract a timestamp corresponding to an AU of a right image. For example, when the right image is in accordance with the MDTV broadcast standard, the timestamp corresponding to the AU of the right image is represented by an RTP timestamp. Alternatively, when the right image uses a PTS generated based on a different reference clock, the timestamp corresponding to the AU of the right image is represented by a PTS.

In operation 1003, the content providing apparatus 201 may generate a timestamp pair including the timestamp corresponding to the AU of the left image and the timestamp corresponding to the AU of the right image as synchronization information. In the timestamp pairing mode, a timestamp pair including a PTS and an RTP timestamp may be used as synchronization information, or a timestamp pair including two PTSs generated based on different reference clocks may be used as synchronization information.

In operation 1004, the content providing apparatus 201 may multiplex the synchronization information by inserting the synchronization information into a main content stream of the left image or a additional view content stream of the right image as signaling information. For example, the content providing apparatus 201 may insert the generated synchronization information into the main content stream or the additional view content stream as a descriptor transmitted periodically. For example, when the synchronization information is inserted into the main content stream as signaling information, the content providing apparatus 201 may insert the synchronization information into a signaling table, such as a Program Map Table (PMT), a Virtual Channel Table (VCT), and an Event Information Table (EIT), as a descriptor. When the synchronization information is inserted into the additional view content stream as signaling information, the content providing apparatus 201 may insert the synchronization information into a signaling table, such as a Fast Information Channel (FIC), a Service Map Table (SMT), and a Service Labeling Table (SLT), as a descriptor.

Figure 11:
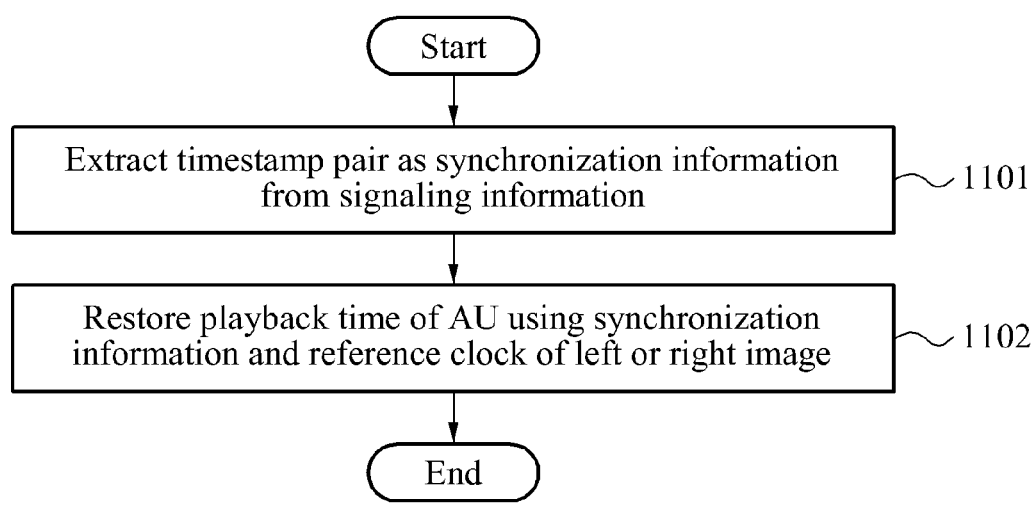
FIG. 11 illustrates a content reproduction method based on the timestamp pairing mode according to the first exemplary embodiment of the present invention.

FIG. 11 illustrates a content reproduction method based on the timestamp pairing mode according to first exemplary embodiment of the present invention.

In operation 1101, the content reproduction apparatus 202 may extract the timestamp pair as synchronization information from the signaling information. Here, the signaling information may include the signaling information on the main content stream corresponding to the left image or the signaling information on the additional view content stream corresponding to the right image.

The content reproduction apparatus 202 may extract, as the synchronization information, a timestamp pair including a PTS and an RTP timestamp from the signaling information on the main content stream or the signaling information on the additional view content stream. The PTS represents an MPEG-2 system-based presentation time (a presentation time for a conventional 2D ATSC main service) of the AU included in the main content stream as a synchronization reference. The RTP timestamp represents an MDTV standard-based presentation time, in particular, a presentation time for a conventional 2D ATSC mobile service, of the AU included in the additional view content stream as a synchronization reference. Alternatively, the content reproduction apparatus 202 may extract a timestamp pair including timestamps of left and right images based on different reference clocks as synchronization information from the signaling information on the main content stream or the signaling information on the additional view content stream.

The PTS of the main content stream and the RTP timestamp of the additional view content stream as the synchronization references have different forms due to different timing models of the respective standards. However, it is assumed that the PTS of the main content stream and the RTP timestamp of the additional view content stream represent the same presentation time at a synchronization point in 3DTV viewing. Alternatively, when the PTS of the main content stream and the PTS of the additional view content stream as the synchronization references are generated based on different reference clocks, the AU of the left image and the AU of the right image to be output at the same time may have different PTS values. However, it is assumed that the PTS of the main content stream and the PTS of the additional view content stream represent the same presentation time at a synchronization point in 3DTV viewing. The present invention may restore a playback time of an AU based on these assumptions.

In operation 1102, the content reproduction apparatus 202 may restore playback times of the AUs using the synchronization information and a reference clock of the left image or the right image. In the timestamp pairing mode, a timestamp of content to be reproduced is converted into a proper form for the reference clock using the synchronization information when the playback times of the AUs of the left and right images are restored. In detail, when the playback times of the AUs are restored for 3D reproduction, the timestamp pairing mode may set either an NTP reference clock or a PCR reference clock as the reference clock.

Even though the left and right images are configured in different timing models for the timestamp of the AU of the left image and the timestamp of the AU of the right image to be in different forms, matching the timestamp forms based on a reference clock associated with either the left image or the right image is necessary at an actual synchronization process.

For example, when the NTP reference clock is used, the content reproduction apparatus 202 converts the PTS of the AU of the left image (ATSC-Main) into an NTP timestamp form. Further, when the PCR reference clock is used, the content reproduction apparatus 202 converts the RTP timestamp of the AU of the right image (MDTV) into a PTS form.

Concisely, the content reproduction apparatus 202 may restore the playback times of the respective AUs of the left and right images using the synchronization information based on the PCR or the NTP reference clock. For example, when synchronization is carried out in accordance with the PCR, the content reproduction apparatus 202 may convert the RTP timestamp of the AU included in the additional view content stream into timing information in a PTS form used in the MPEG-2 system standard.

When synchronization is carried out in accordance with the NTP reference clock, the content reproduction apparatus 202 may convert the PTS of the AU included in the main content stream into timing information in an NTP timestamp form or RTP timestamp form used in the MDTV standard. This playback time restoration process makes it possible to output the main content stream and the additional view content stream in accordance with a single reference clock, that is, the PCR or NTP clock. Accordingly, the left and right images of the main content stream and the additional view content stream mutually matched may be output at the same time in accordance with the corresponding reference clock.

When the left and right images use the same timing model, a timestamp conversion process may be necessary in the reproduction. For example, although both the left image and the right image use a PTS-based timing model and the same PCR-type reference clocks, when encoding processes are independently carried out by separate encoders, absolute reference clock values at sampling time of the encoders for the left and right images may be different. In this case, the AUs of the left and right images to be output at the same time from the main content stream and the additional view content stream in 3D viewing may have different PTS values. In this case, although both images use the same PCR-type reference clocks, converting the PTS value of any one image stream of the main content stream and the additional view content stream using the synchronization information for counting a presentation time based on the PCR clock of the other of the image streams is necessary.

Figure 12:
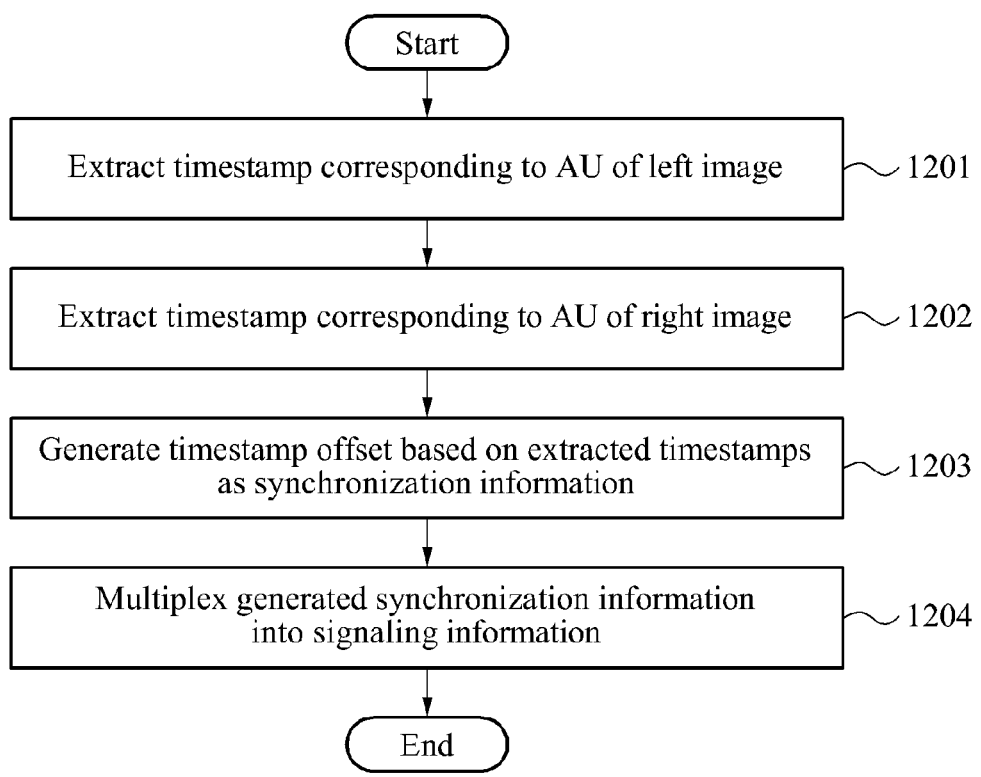
FIG. 12 illustrates a content providing method based on the timestamp offset mode according to the second exemplary embodiment of the present invention.

FIG. 12 illustrates a content providing method based on the timestamp offset mode according to a second exemplary embodiment of the present invention.

A main content stream corresponding to a left image for a 3DTV broadcast service and a additional view content stream corresponding to a right image have the same frame rate and timestamps used for the main content stream and the additional view content stream have the same clock rate, that is, a PTS of an MPEG-2 system and an RTP timestamp of an MDTV system have the same clock rate. Accordingly, in the timestamp offset mode, timestamps offsets corresponding to AUs of the left and right images to be output at the same particular time for a 3DTV service are used as synchronization information. In operation 1201, the content providing apparatus 201 may extract a timestamp corresponding to the AU of the left image.

In operation 1202, the content providing apparatus 201 may extract a timestamp corresponding to the AU of the right image.

In operation 1203, the content providing apparatus 201 may generate a timestamp offset based on the timestamp corresponding to the AU of the left image and the timestamp corresponding to the AU of the right image as synchronization information. The content providing apparatus 201 may generate the timestamp offset based on the timestamps corresponding to the AUs of the left and right images to be output at the same particular time for a 3DTV service as synchronization information. In a mobile/stationary hybrid 3DTV, the timestamp of the AU of the left image is a PTS, and the timestamp of the AU of the right image is an RTP timestamp. Alternatively, timestamps in the same form based on different reference clocks depending on a 3DTV system may be used to calculate the offset.

Thus, in the timestamp offset mode, an offset between the PTS and the RTP timestamp synchronized with each other or two PTSs or RTP timestamps based on different reference clocks may constitute the synchronization information. In the timestamp offset mode, since synchronization is carried out just by transmitting the offset between the timestamps corresponding to the left and right images, an amount of data to be transmitted may be less than in the timestamp pairing mode.

For example, the content providing apparatus 201 may generate a timestamp offset related to a difference between the PTS of the AU included in the main content stream and the RTP timestamp of the AU included in the additional view content stream which are synchronized, as the synchronization information. Since the PTS and the RTP timestamp have different bits (PTS: 33 bits, RTP timestamp: 32 bits), the timestamp offset is counted using an offset between low-order 32 bits of the PTS and all 32 bits of the RTP timestamp, ignoring the most significant bit (MSB) of the PTS.

In operation 1204, the content providing apparatus 201 may multiplex the generated synchronization information by inserting the synchronization information into the main content stream of the left image or the additional view content stream of the right image as signaling information.

For example, the content providing apparatus 201 may insert the generated synchronization information into the main content stream or the additional view content stream as a descriptor transmitted periodically. For example, when the synchronization information is inserted into the main content stream, the content providing apparatus 201 may insert the synchronization information into a signaling table, such as a PMT, a TVCT, and an EIT, as a descriptor. When the synchronization information is inserted into the additional view content stream as signaling information, the content providing apparatus 201 may insert the synchronization information into a signaling table, such as a FIC, an SMT, and an SLT, as a descriptor.

Figure 13:
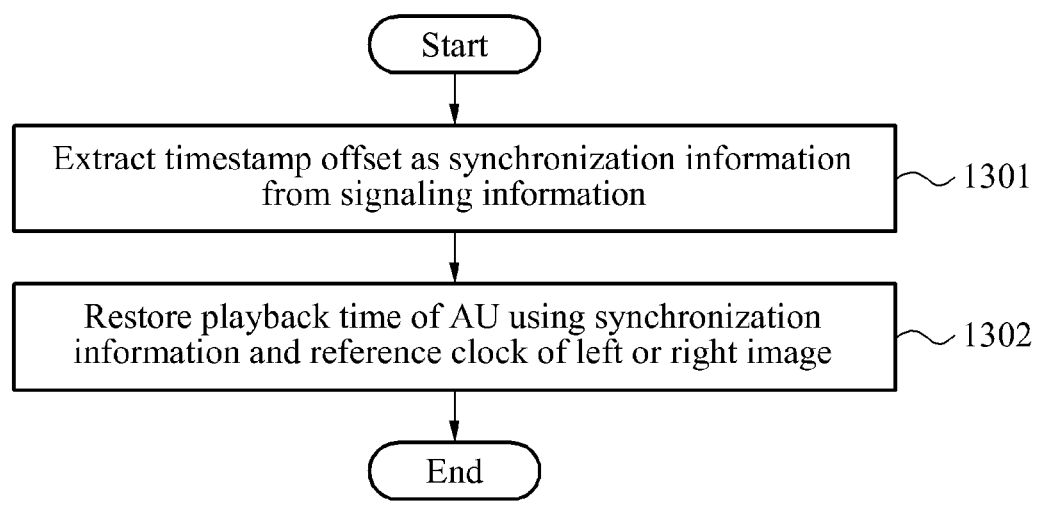
FIG. 13 illustrates a content reproduction method based on the timestamp offset mode according to the second exemplary embodiment of the present invention.

FIG. 13 illustrates a content reproduction method based on the timestamp offset mode according to a second exemplary embodiment of the present invention.

In operation 1301, the content reproduction apparatus 202 may extract, as the synchronization information, the timestamp offset from the signaling information. In detail, the content reproduction apparatus 202 may extract the synchronization information from the signaling information of the main content stream in accordance with the ATSC main broadcast standard or the signaling information of the additional view content stream in accordance with the MDTV broadcast standard.

In operation 1302, the content reproduction apparatus 202 may restore playback times of the AUs using the synchronization information and a reference clock of the left or right image.

The content reproduction apparatus 202 may restore the playback times based on the PCR or the NTP reference clock using the synchronization information extracted from the signaling information. For example, when synchronization is carried out in accordance with the PCR, the content reproduction apparatus 202 may convert the RTP timestamp of the AU included in the additional view content stream into timing information in a PTS form used in the MPEG-2 system standard. Alternatively, PTS information on one stream may be converted for synchronization to be carried out based on a PCR of the other stream among different PCRs.

When synchronization is carried out in accordance with the NTP reference clock, the content reproduction apparatus 202 may convert the PTS of the AU included in the main content stream into timing information in an NTP timestamp form or RTP timestamp form used in the MDTV standard. This playback time restoration process makes it possible to output the main content stream and the additional view content stream in accordance with a single reference clock, that is, the PCR or NTP clock. Accordingly, the left and right images of the main content stream and the additional view content stream mutually matched may be output at the same time in accordance with the corresponding reference clock.

Figure 14:
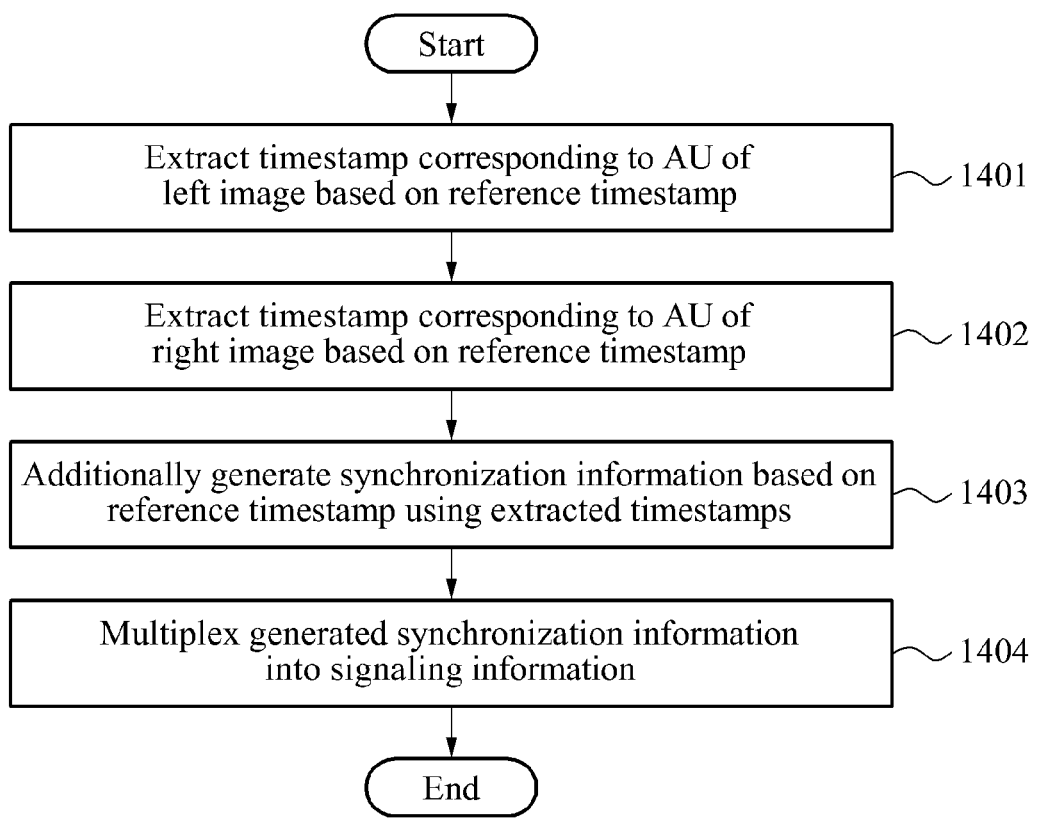
FIG. 14 illustrates a content providing method based on the NTP synchronization mode according to the third exemplary embodiment of the present invention.

FIG. 14 illustrates a content providing method based on the NTP synchronization mode according to a third exemplary embodiment of the present invention.

In the NTP synchronization mode, an NTP timestamp calculated separately for synchronization of left and right images is generated using a timestamp of an AU of the left image and a timestamp of an AU of the right image.

In detail, it is assumed that the AUs of the left and right images have different timing models but are already synchronized in accordance with a reference clock. Here, the timestamp of the AU of the left image and the timestamp of the AU of the right image at a synchronization time may be obtained using the NTP timestamp that is a reference timestamp obtained from the reference clock. An NTP timestamp as synchronization information used when the left and right images are reproduced may be additionally generated based on the obtained timestamps.

In particular, in the NTP synchronization mode, an NTP timestamp generated separately for synchronization of a main content stream and a additional view content stream is additionally transmitted in addition to a PTS of the main content stream in accordance with the ATSC main broadcast standard and an RTP timestamp of the additional view content stream in accordance with the MDTV broadcast standard.

In operation 1401, the content providing apparatus 201 may extract a timestamp corresponding to an AU of a left image.

In operation 1402, the content providing apparatus 201 may extract a timestamp corresponding to an AU of a right image.

In operation 1403, the content providing apparatus 201 may generate a timestamp pair including the timestamp corresponding to the AU of the left image and the timestamp corresponding to the AU of the right image as synchronization information.

For example, the content providing apparatus 201 may additionally generate synchronization information for synchronization of a main content stream in accordance with the ATSC main broadcast standard and a additional view content stream in accordance with the MDTV broadcast standard. For example, the content providing apparatus 201 may generate an NTP timestamp for synchronization of the main content stream and the additional view content stream using a PTS of the main content stream and an RTP timestamp of the additional view content stream. Here, the NTP timestamp is a reference timestamp. The PTS of the main content stream and the RTP timestamp of the additional view content stream may be obtained through the NTP timestamp as the reference timestamp.

In detail, the content providing apparatus 201 may generate the timestamps corresponding to the AUs of the left and right images to be output at the same particular time for a 3DTV service as the synchronization information. Here, the same time is a synchronization time of the left and right images. Here, when playback times obtained at the synchronization time through the timestamp of the AU of the left image and the timestamp of the AU of the right image are the same, a 3DTV service may be enabled.

In this case, the main content stream corresponding to the left image and the additional view content stream corresponding to the right image to be reproduced from the synchronization time are matched with each other, thereby reproducing a 3D image. The timestamp of the left image may be a PTS, and the timestamp of the right image may be an NTP timestamp. Here, the main content stream and the additional view content stream may be synchronized based on an NTP reference clock.

In operation 1404, the content providing apparatus 201 may multiplex the generated synchronization information by inserting the synchronization information into the main content stream of the left image or the additional view content stream of the right image as signaling information.

For example, the content providing apparatus 201 may packetize the NTP timestamp as the synchronization information and insert the packetized NTP timestamp as a descriptor of the main content stream or the additional view content stream periodically transmitted. Here, the synchronization information may be included as the signaling information of the main content stream or the additional view content stream periodically transmitted. For example, the descriptor may include a PMT periodically transmitted through an MPEG-TS packet, an EIT, or a TVCT included in an ATSC PSIP standard.

In addition, the content providing apparatus 201 may insert the timestamp of the main content stream, the PTS, into a bit stream as synchronization information in accordance with the ATSC main broadcast standard and the timestamp of the additional view content stream, the RTP timestamp, into a bit stream in accordance with the MDTV broadcast standard.

Figure 15:
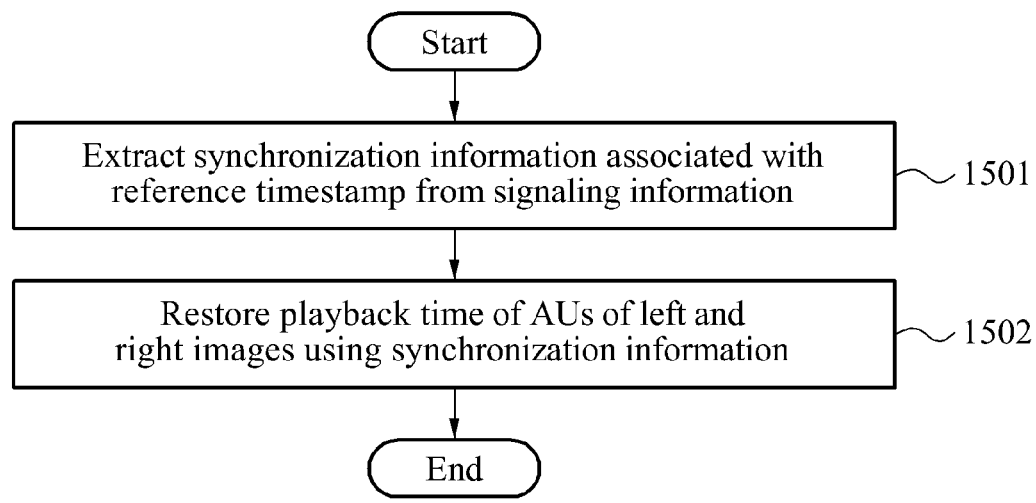
FIG. 15 illustrates a content reproduction method based on the NTP synchronization mode according to the third exemplary embodiment of the present invention.

FIG. 15 illustrates a content reproduction method based on the NTP synchronization mode according to a third exemplary embodiment of the present invention.

In operation 1501, the content reproduction apparatus 202 may extract the timestamp pair as the synchronization information from the signaling information. For example, the content reproduction apparatus 202 may extract the NTP timestamp as the synchronization information from the signaling information of the main content stream or the additional view content stream periodically transmitted in accordance with the ATSC main broadcast standard.

In operation 1502, the content reproduction apparatus 202 may restore playback times of the AUs using the synchronization information and a reference clock of the left image or the right image.

For example, the content reproduction apparatus 202 may restore a playback time of the main content stream in accordance with the ATSC main broadcast standard and a playback time of the additional view content stream in accordance with the MDTV broadcast standard using the synchronization information. For example, the content reproduction apparatus 202 may restore the playback time of the AU of the main content stream, PTS_A, using the NTP timestamp (NTP_M') as the synchronization information and a PTS' generated from Wallclock_A. Here, the content reproduction apparatus 202 may restore the playback time of the main content stream, PTS_A, considering that the PTS' generated from Wallclock_A is reversed.

Alternatively, the content reproduction apparatus 202 may restore the playback time of the additional view content stream, PTS_M, using the NTP timestamp (NTP_M') as the synchronization information and the RTP timestamp RTP' obtained from Wallclock_M. Here, the content reproduction apparatus 202 may restore the playback time of the AU of the additional view content stream, PTS_M, considering that the RTP timestamp RTPS' is reversed. Here, Wallclock is an NTP timestamp that is a 64-bit fixed-point number unsigned, including a 32-bit integer and a 32-bit decimal. Wallclock_A is an NTP timestamp associated with the main content stream, and Wallclock_M is an NTP timestamp associated with the additional view content stream. Wallclock_A and Wallclock_M are synchronized with each other and have the same NTP timestamp at the synchronization time.

A content providing method according to an exemplary embodiment may include generating a timestamp pair including a timestamp corresponding to an AU of a left image and a timestamp corresponding to an AU of a right image as synchronization information and multiplexing the synchronization information using signaling information.

A content reproduction method according to an exemplary embodiment may include extracting a timestamp pair including a timestamp corresponding to an AU of a left image and a timestamp corresponding to an AU of a right image as synchronization information from signaling information and restoring playback times of the AUs of the left and right images using the synchronization information and a reference clock of the left image or the right image.

A content providing method according to another exemplary embodiment may include generating a timestamp offset between timestamps corresponding to an AU of a left image and an AU of a right image to be synchronized as synchronization information and multiplexing the synchronization information using signaling information.

A content reproduction method according to another exemplary embodiment may include extracting, as the synchronization information, a timestamp offset between timestamps corresponding to an AU of a left image and an AU of a right image from signaling information and restoring playback times of the AUs of the left and right images using the synchronization information and a reference clock of the left image or the right image.

A content providing method according to still another exemplary embodiment may include generating synchronization information using a first timestamp corresponding an AU of a left image and a second timestamp corresponding to an AU of a right image based on a reference timestamp and multiplexing the synchronization information using signaling information.

A content reproduction method according to still another exemplary embodiment may include extracting synchronization information based on a first timestamp corresponding an AU of a left image and a second timestamp corresponding to an AU of a right image from signaling information, the synchronization information being associated with a reference timestamp, and restoring playback times of the AUs of the left and right images using the synchronization information.

The methods according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A content providing apparatus comprising: one or more processors configured to:
    generate a timestamp offset between timestamps corresponding to an access unit (AU) of a one view image or an AU of an other view image to be synchronized as synchronization information; and
    multiplex the synchronization information into signaling information wherein the timestamp offset is determined based on a difference of a presentation timestamp (PTS) and a real-time transport protocol (RTP) timestamp corresponding to the AU (Access Unit), wherein the PTS is related to a main service, and the RTP timestamp is related to a Mobile Digital TV (DTV) service.

2. The content providing apparatus of claim 1, wherein the one or more processors generates a timestamp offset related to a difference between a presentation timestamp (PTS) corresponding to the AU of the one view image and a real-time transport protocol (RTP) timestamp of an AU included in a additional view content stream at a synchronization time as synchronization information.

3. The content providing apparatus of claim 1, wherein the one or more processors generates a timestamp offset related to a difference between a PTS corresponding to the AU of the one view image and a PTS of an AU included in a additional view content stream at a synchronization time as synchronization information.

4. The content providing apparatus of claim 1, wherein the one or more processors generates a timestamp offset related to a difference between an RTP timestamp corresponding to the AU of the one view image and an RTP timestamp of an AU included in a additional view content stream at a synchronization time as synchronization information.

5. The content providing apparatus of claim 1, wherein the one or more processors multiplexes the synchronization information into signaling information of a main content stream corresponding to the one view image or signaling information of a additional view content stream corresponding to the other view image.

6. A content reproduction apparatus comprising: one or more processors configured to:
  extract, as synchronization information, a timestamp offset between timestamps corresponding to an access unit (AU) of a one view image and an AU of an other view image from signaling information; and
  restore playback times of the AUs of the one view image and the other view image using the synchronization information and a reference clock of the one view image or the other view image,
  wherein the timestamp offset is determined based on a difference of a presentation timestamp (PTS) and a real-time transport protocol (RTP) timestamp corresponding to the AU(Access Unit),
  wherein the PTS is related to a main service, and the RTP timestamp is related to a Mobile Digital TV(DTV) service.

7. The content reproduction apparatus of claim 6, wherein the signaling information comprises signaling information of a main content stream corresponding to the one view image or signaling information of a additional view content stream corresponding to the other view image.

8. The content reproduction apparatus of claim 6, wherein the one or more processors synchronizes the playback times of the one view image and the other view image based on a program clock reference (PCR).

9. The content reproduction apparatus of claim 8, wherein the one or more processors converts a real-time transport protocol (RTP) timestamp of the AU corresponding to the other view image into a presentation timestamp (PTS) of the AU corresponding to the one view image.

10. The content reproduction apparatus of claim 8, wherein the one or more processors converts a PTS of the AU corresponding to the other view image into a PTS of the AU corresponding to the one view image.

11. The content reproduction apparatus of claim 6, wherein the one or more processors synchronizes the playback times of the one view image and the other view image based on a network time protocol (NTP) reference clock.

12. The content reproduction apparatus of claim 11, wherein the one or more processors converts a PTS of the AU corresponding to the one view image into an NTP timestamp of the AU corresponding to the other view image.

13. The content reproduction apparatus of claim 11, wherein the one or more processors converts a PTS of the AU corresponding to the one view image into an RTP timestamp of the AU corresponding to the other view image.

14. The content reproduction apparatus of claim 11, wherein the one or more processors converts an RTP timestamp of the AU corresponding to the other view image into an RTP timestamp of the AU corresponding the one view image.

* * * * *